Aug. 20, 1935.  W. J. HUGHES  2,012,194
WATER SOFTENING APPARATUS
Filed June 6, 1927   21 Sheets-Sheet 1
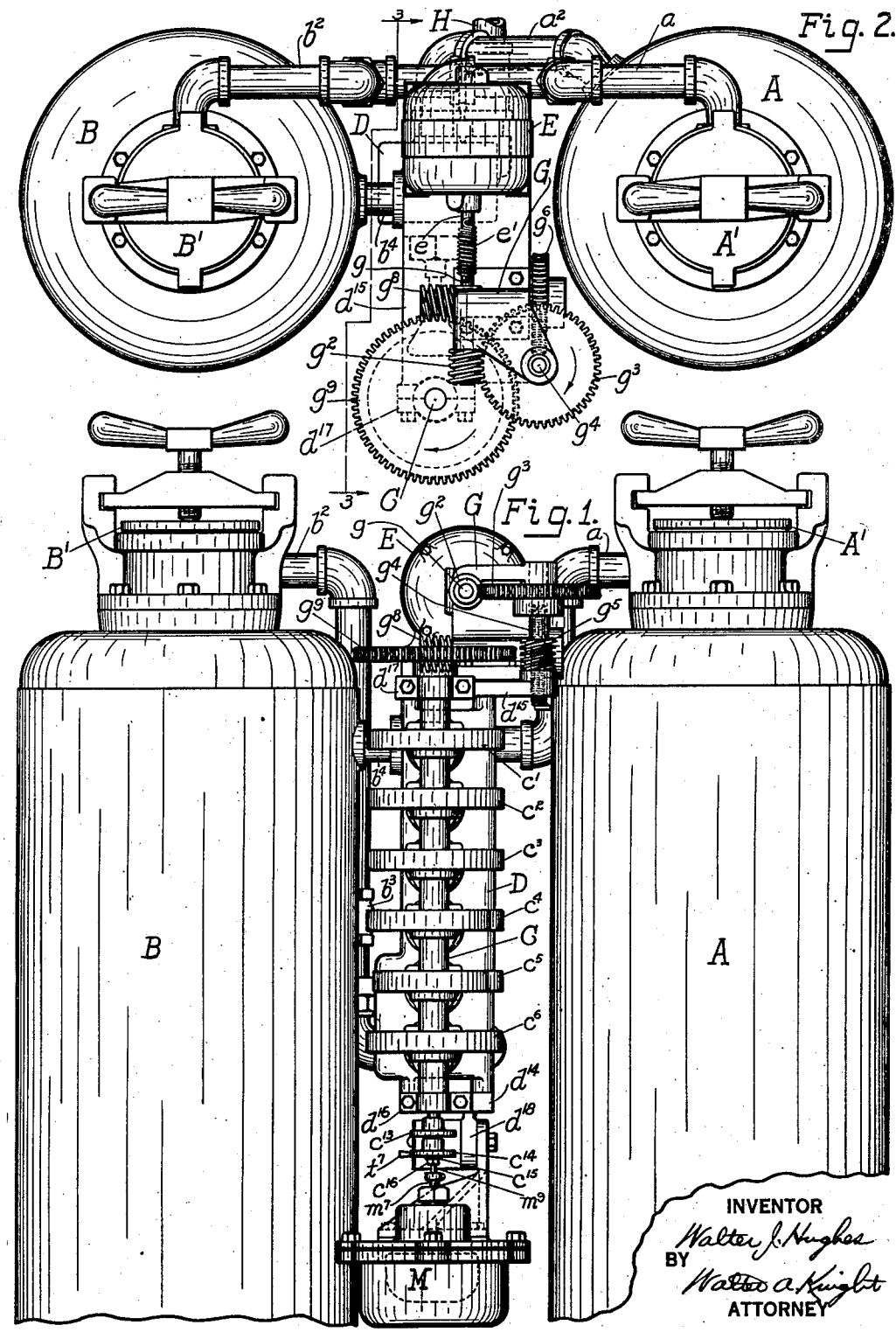

Aug. 20, 1935.  W. J. HUGHES  2,012,194
WATER SOFTENING APPARATUS
Filed June 6, 1927  21 Sheets-Sheet 2
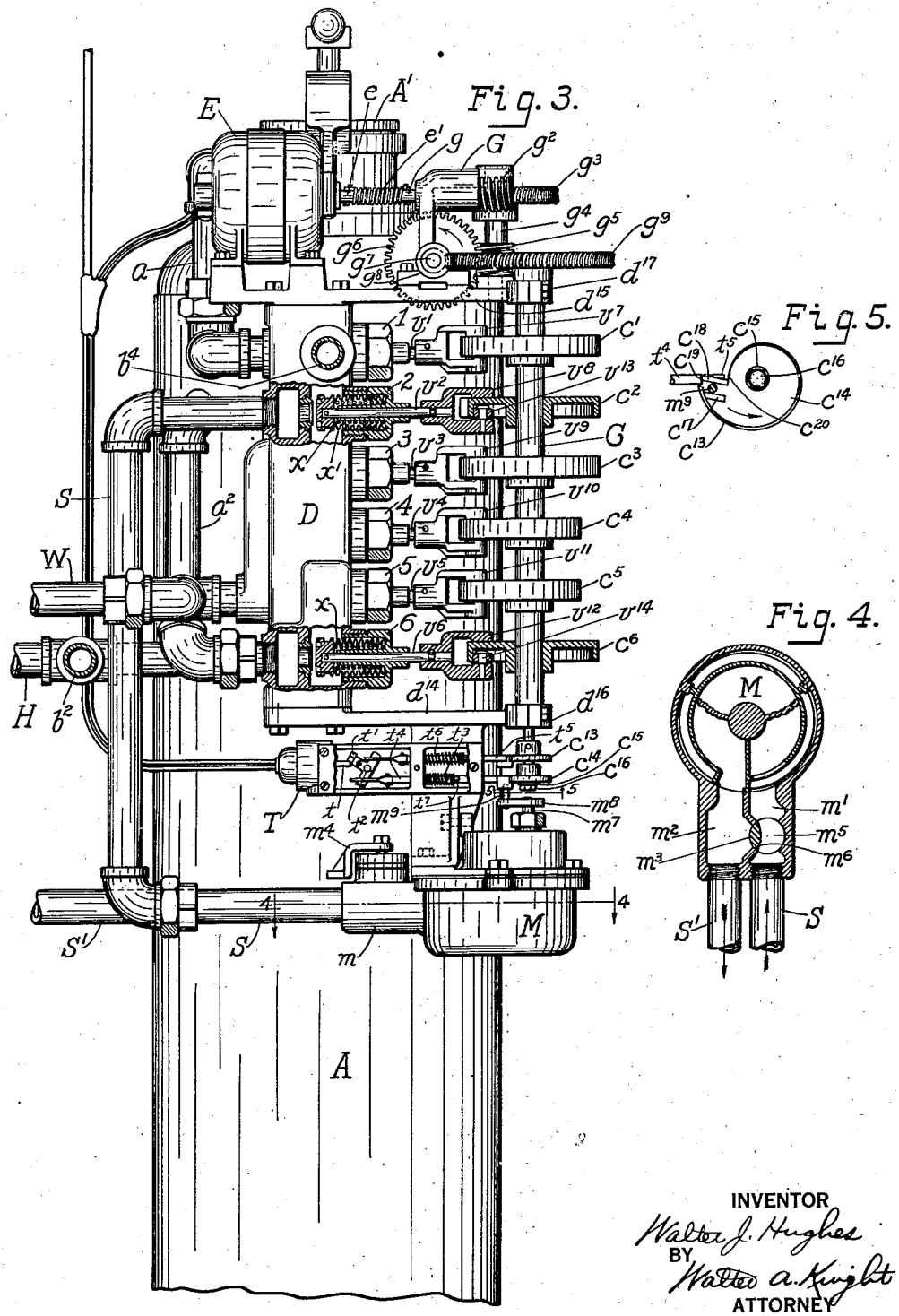
INVENTOR
Walter J. Hughes
BY
Walter A. Knight
ATTORNEY

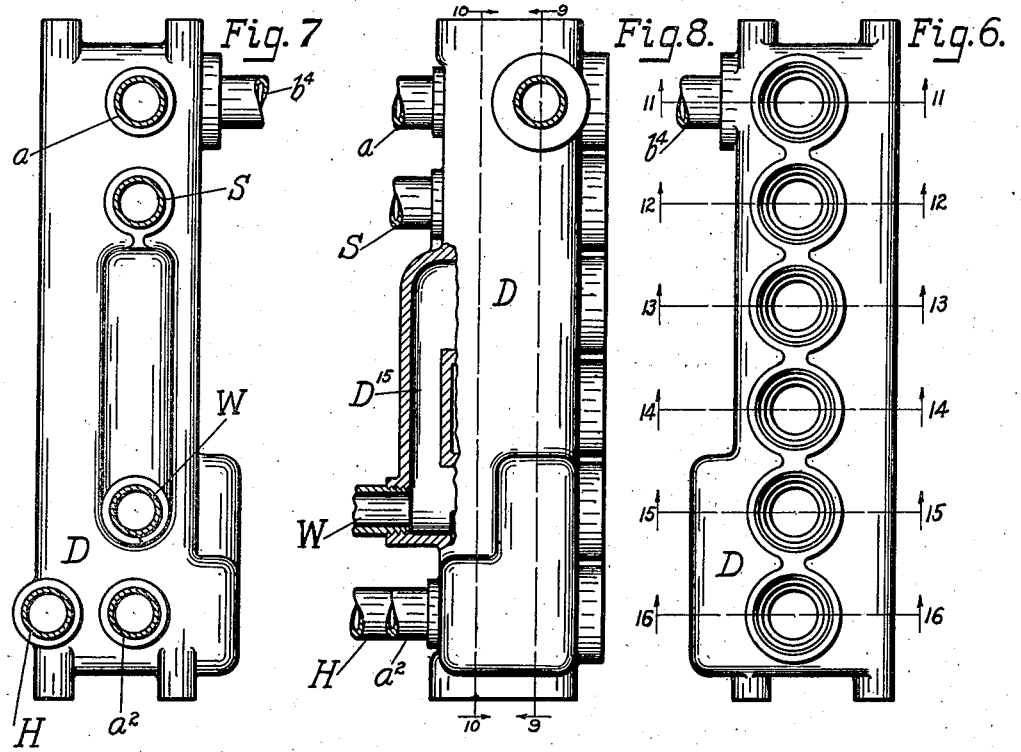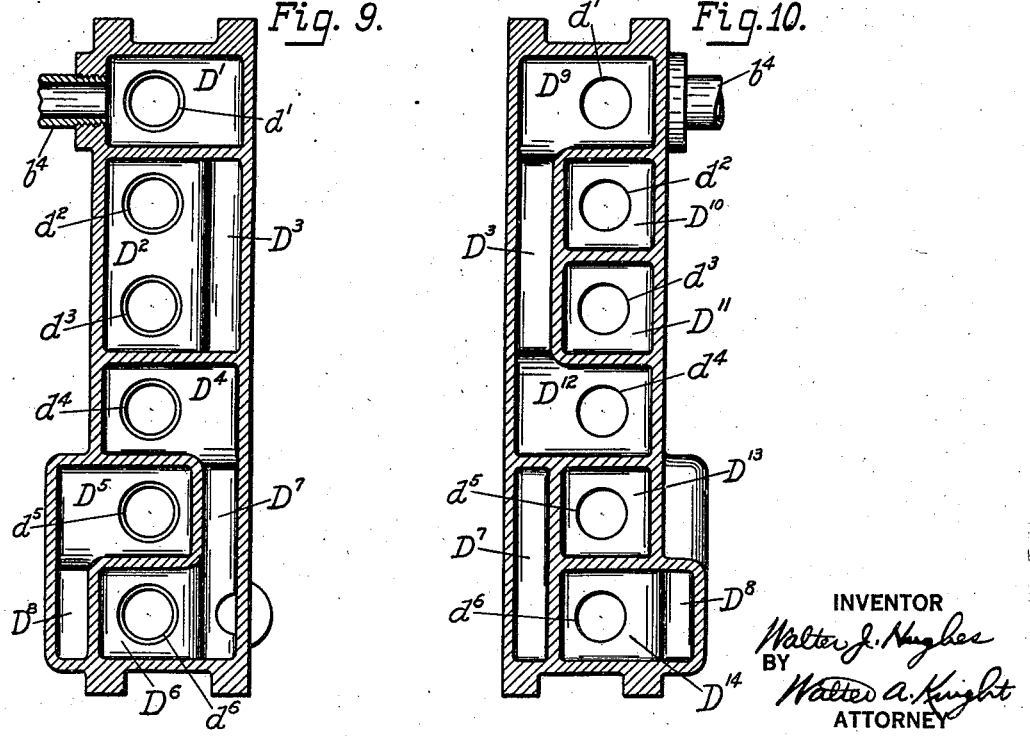

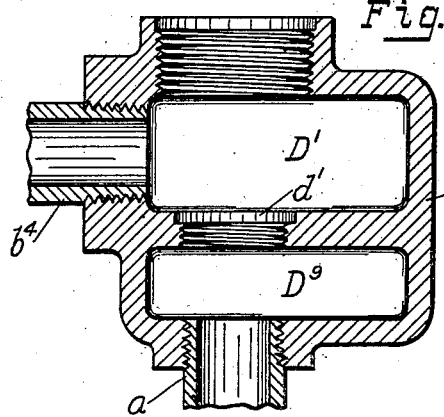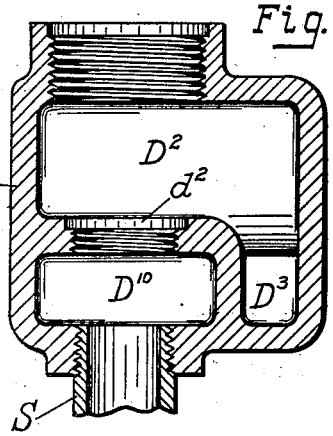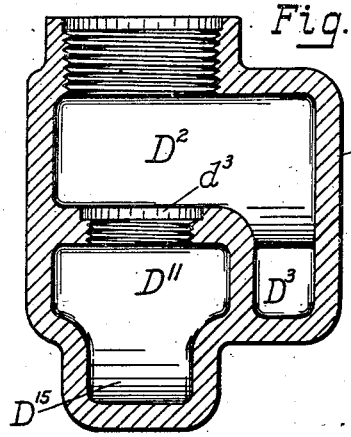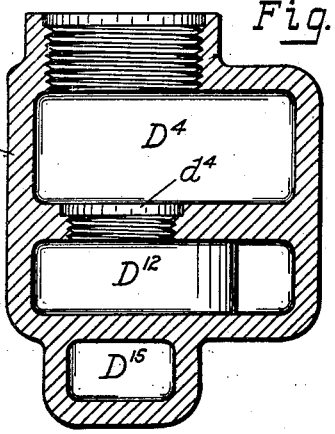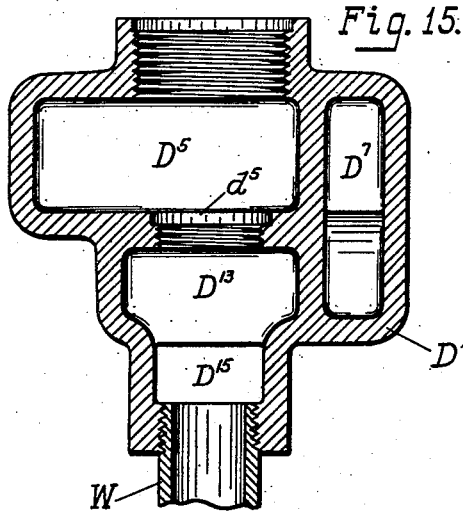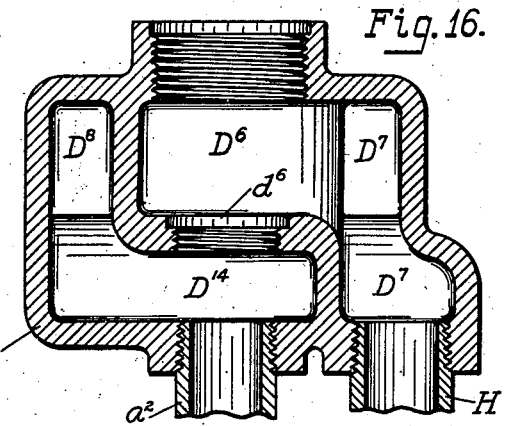

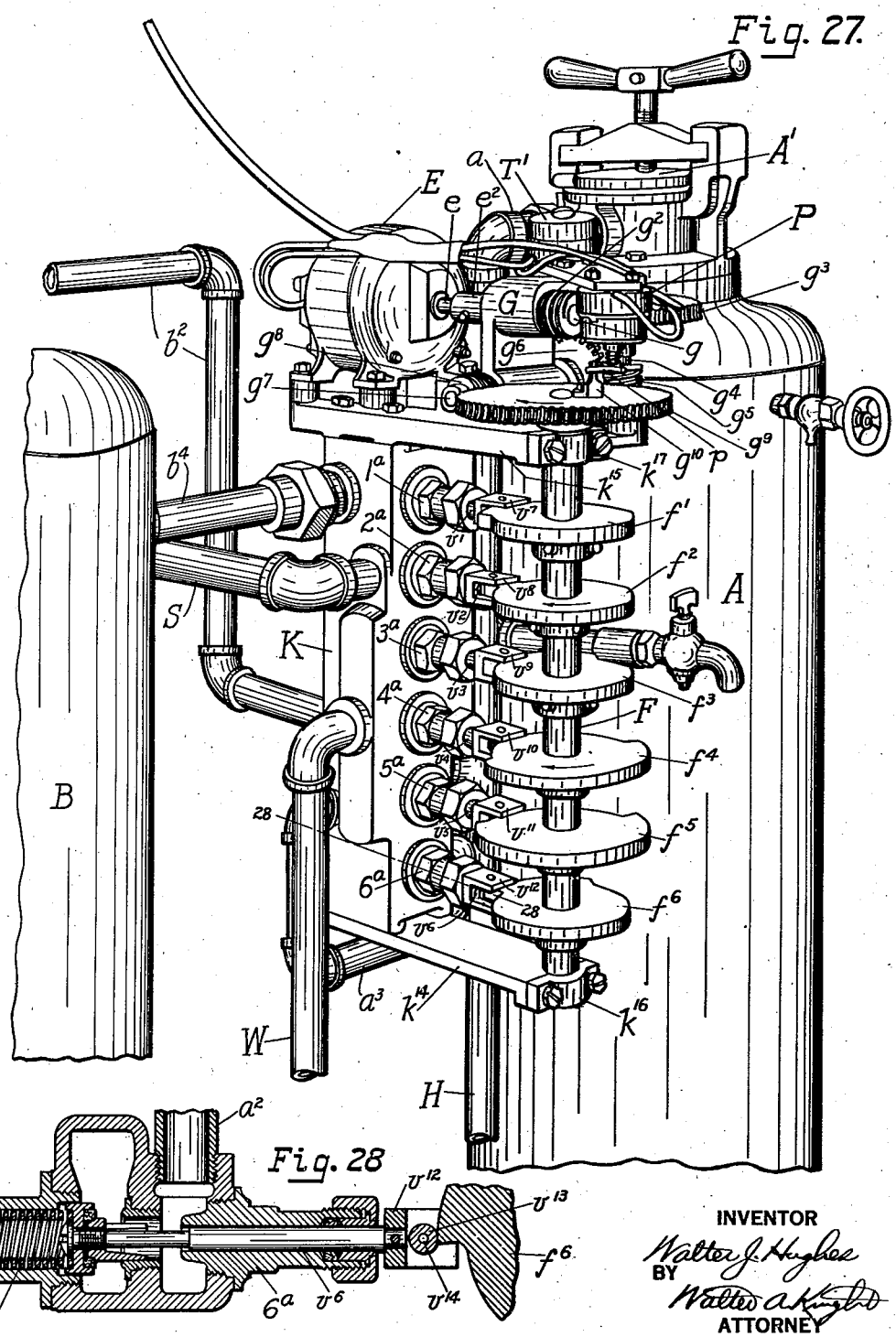

Aug. 20, 1935.     W. J. HUGHES     2,012,194
WATER SOFTENING APPARATUS
Filed June 6, 1927     21 Sheets-Sheet 8

INVENTOR
Walter J. Hughes
BY
Walter A. Knight
ATTORNEY

Aug. 20, 1935.  W. J. HUGHES  2,012,194
WATER SOFTENING APPARATUS
Filed June 6, 1927   21 Sheets-Sheet 10

INVENTOR
Walter J. Hughes
BY
Walter A. Knight
ATTORNEY

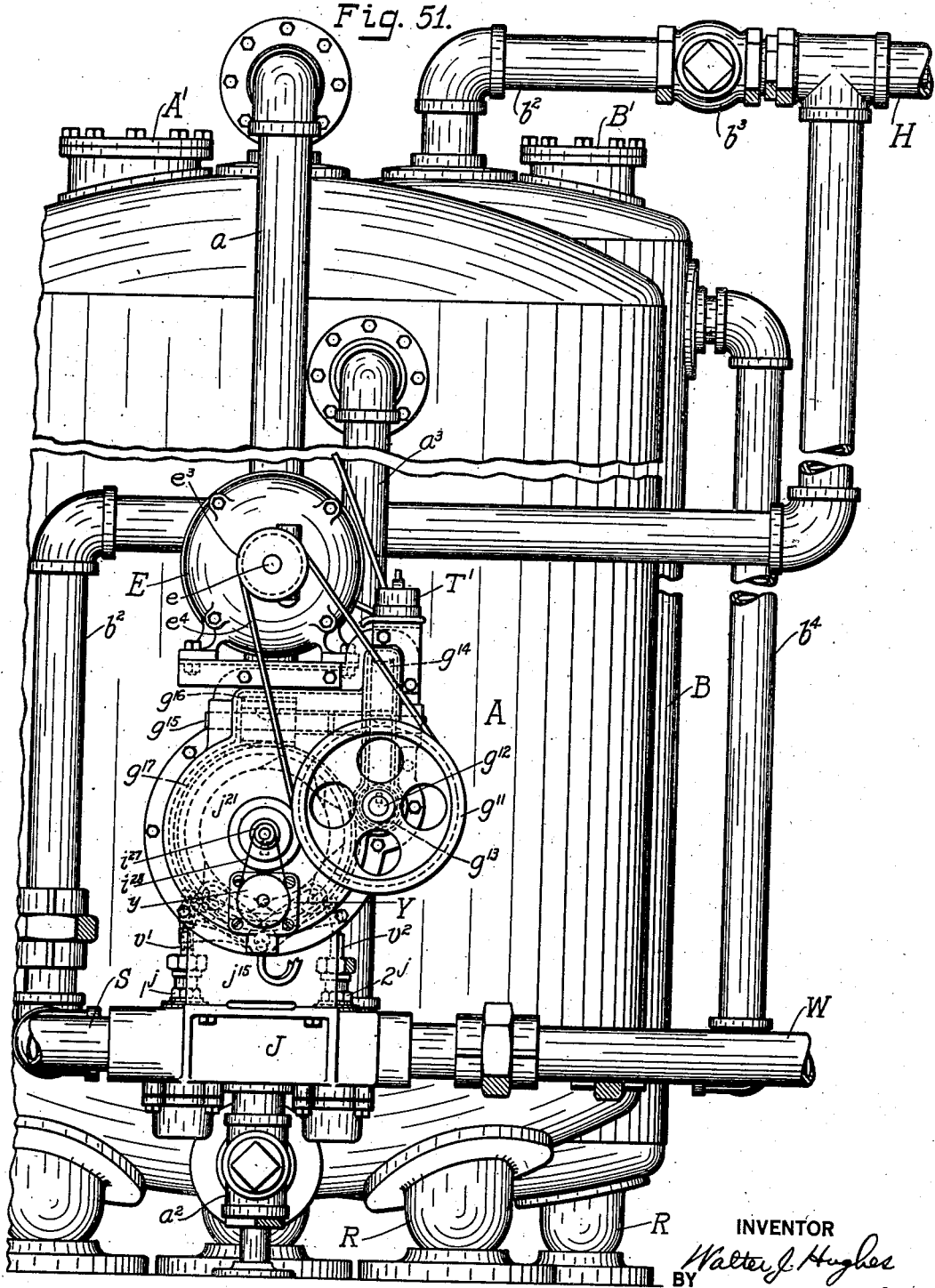

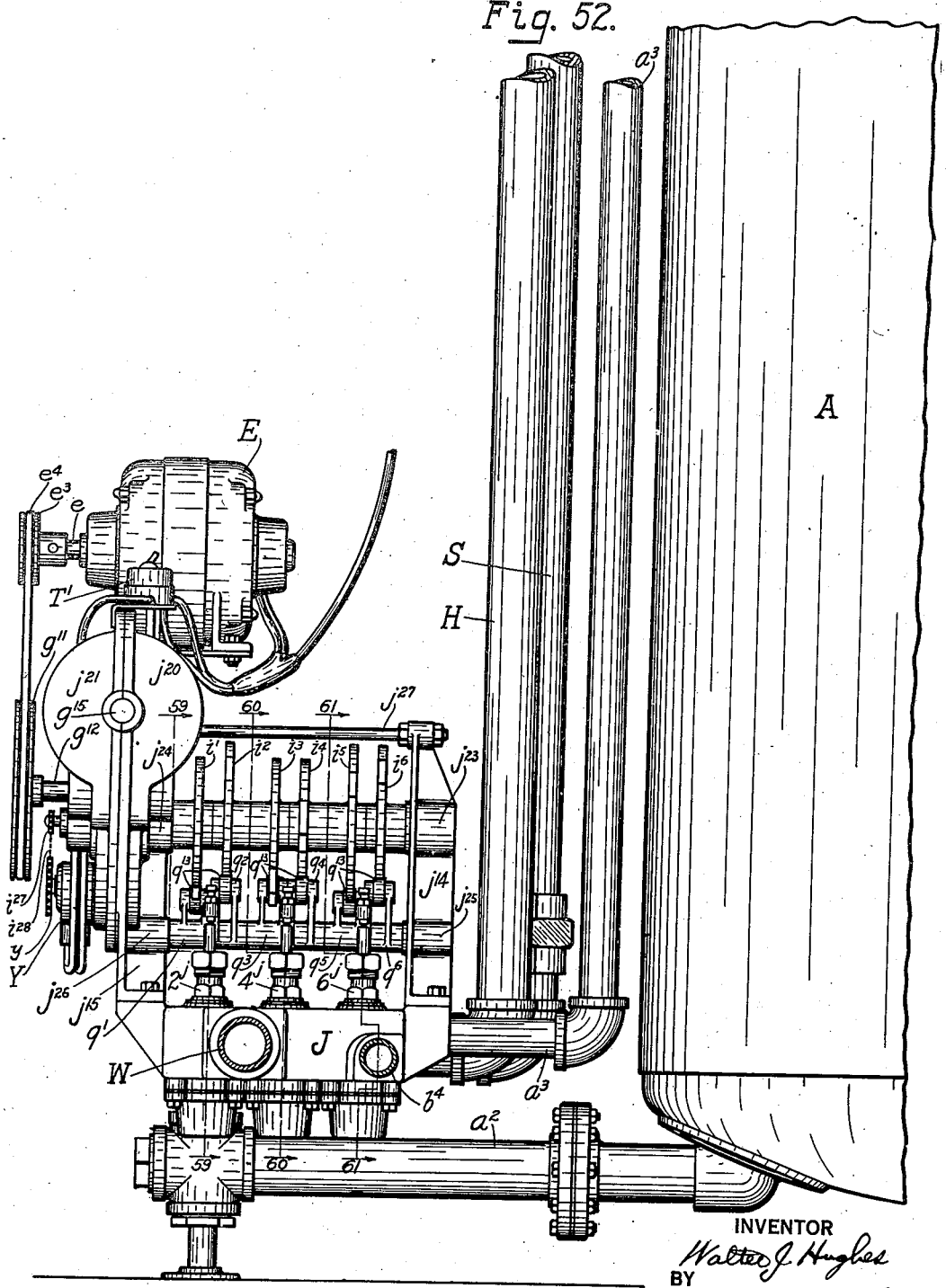

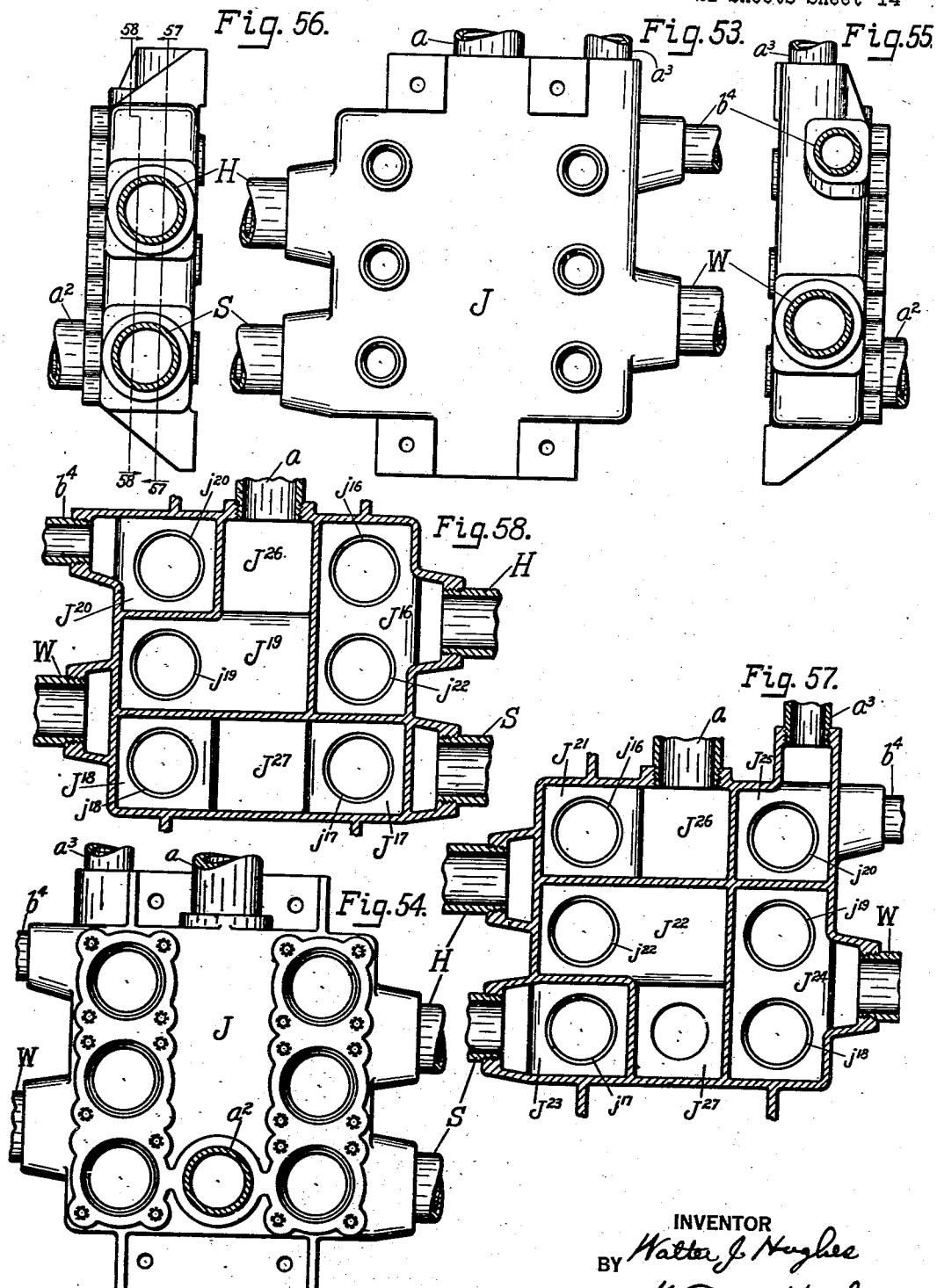

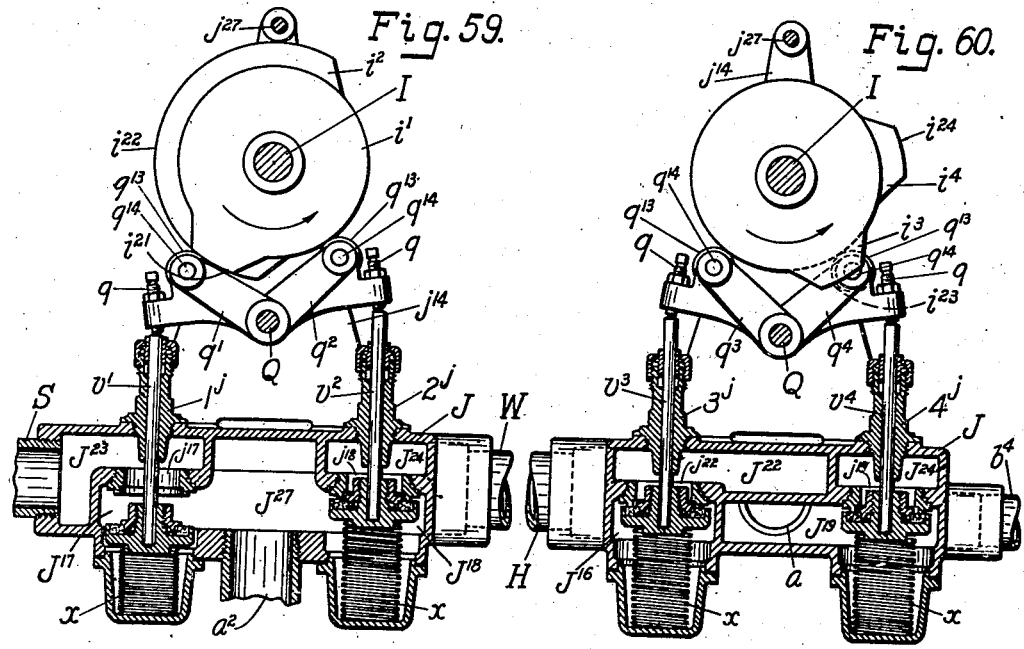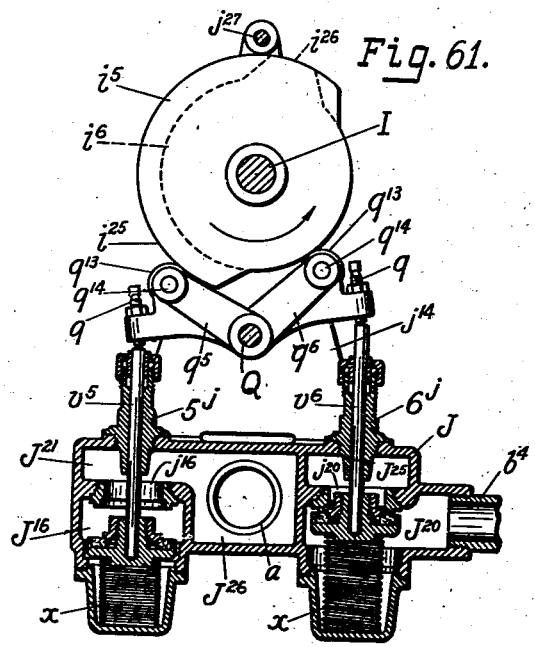

Aug. 20, 1935.  W. J. HUGHES  2,012,194
WATER SOFTENING APPARATUS
Filed June 6, 1927      21 Sheets-Sheet 16

INVENTOR
Walter J. Hughes
BY
Walter A. Knight
ATTORNEY

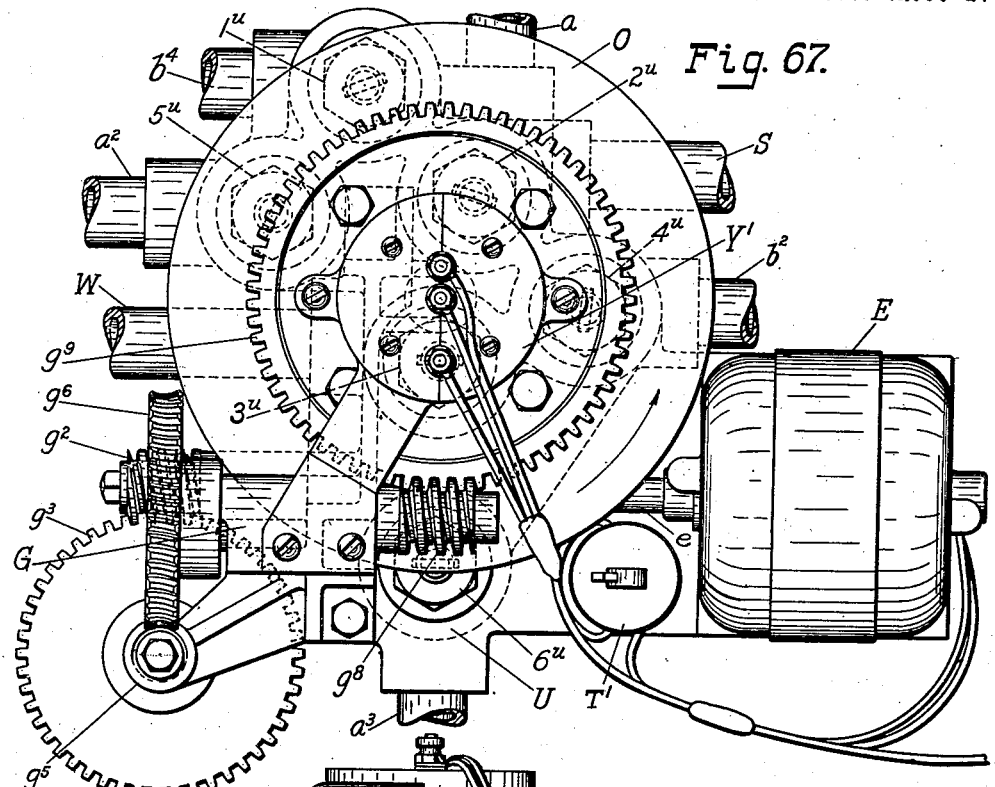
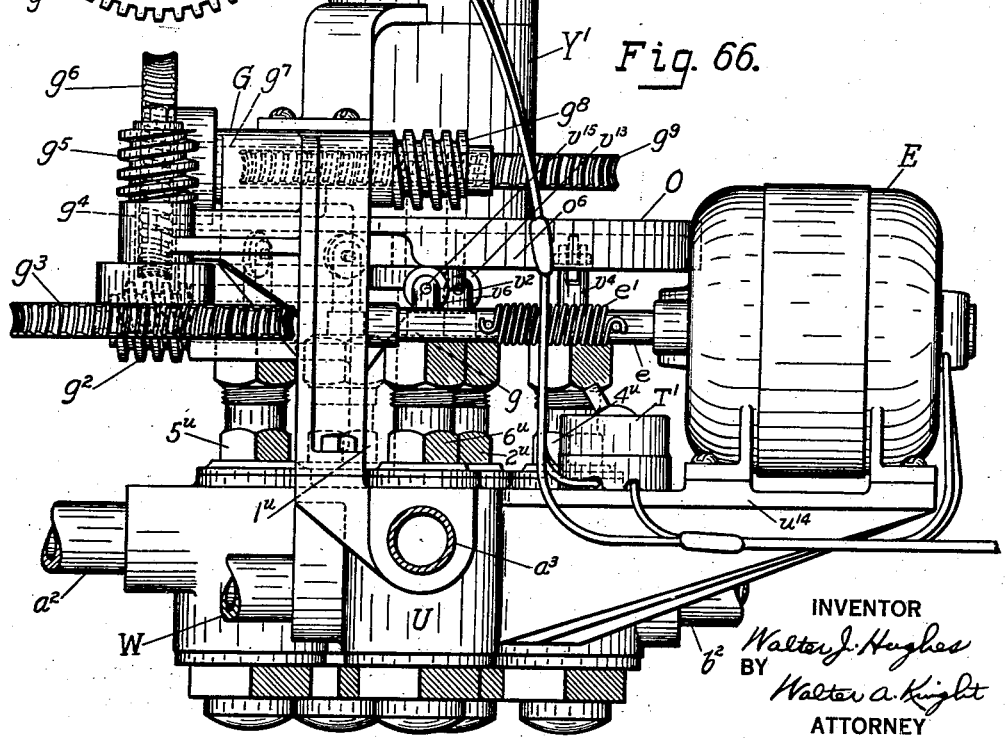

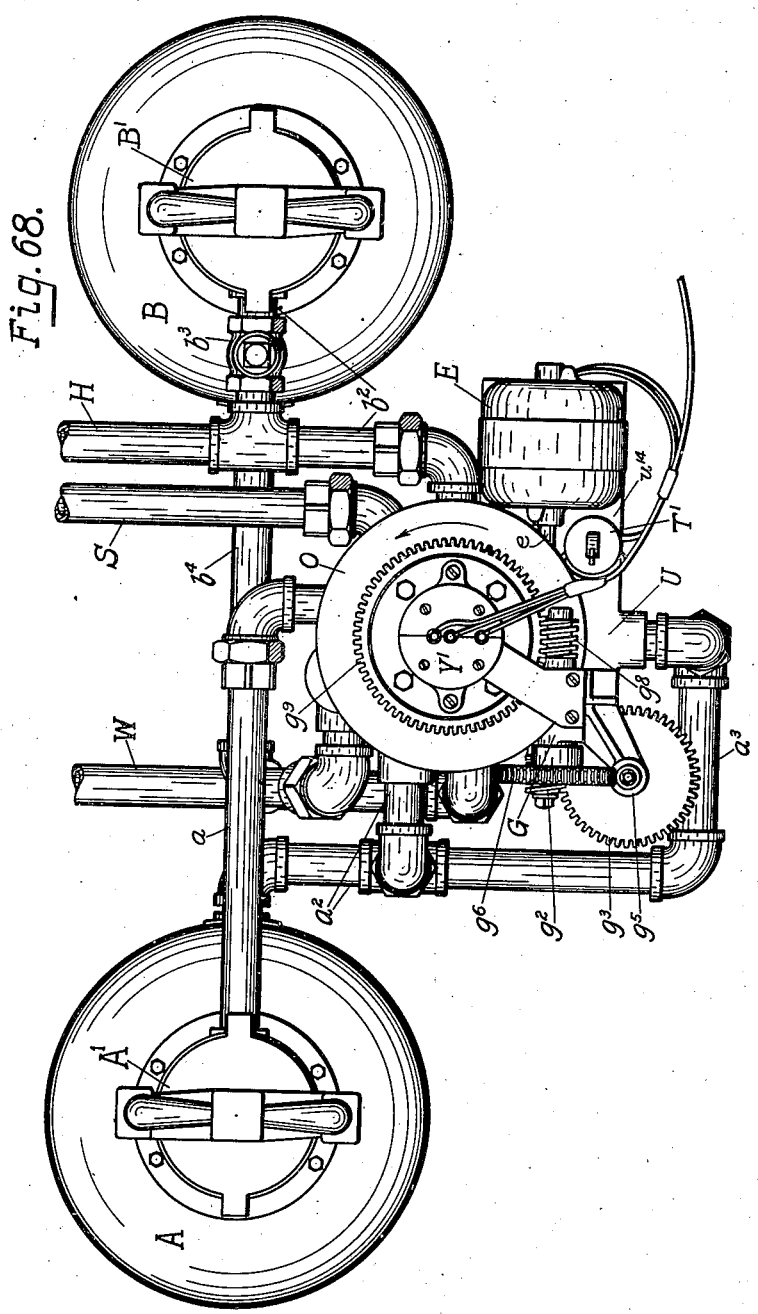

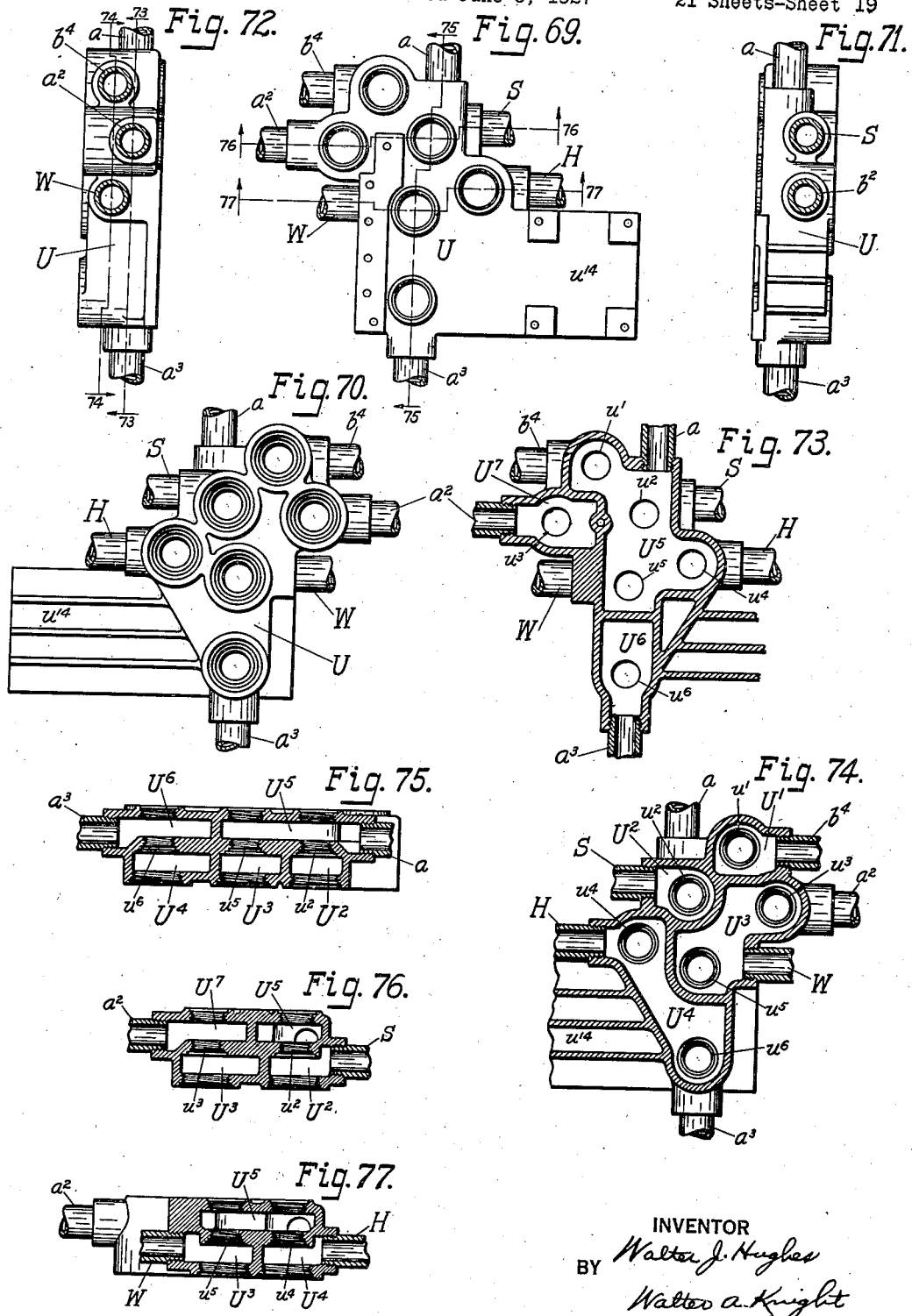

Aug. 20, 1935.  W. J. HUGHES  2,012,194
WATER SOFTENING APPARATUS
Filed June 6, 1927  21 Sheets-Sheet 20
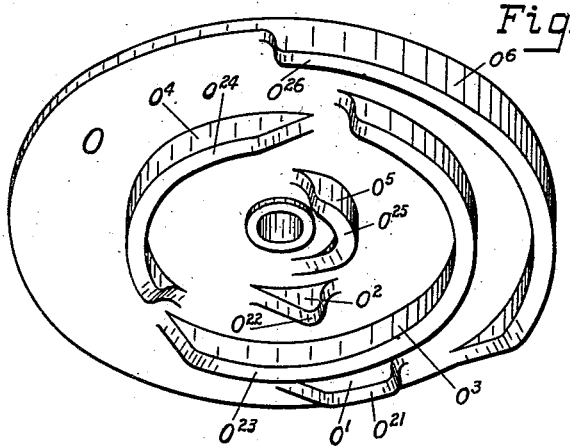
Fig. 78.
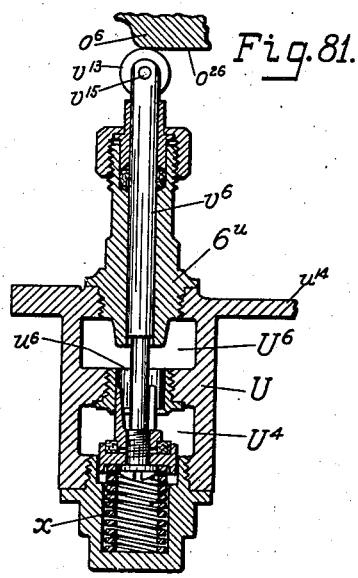
Fig. 81.
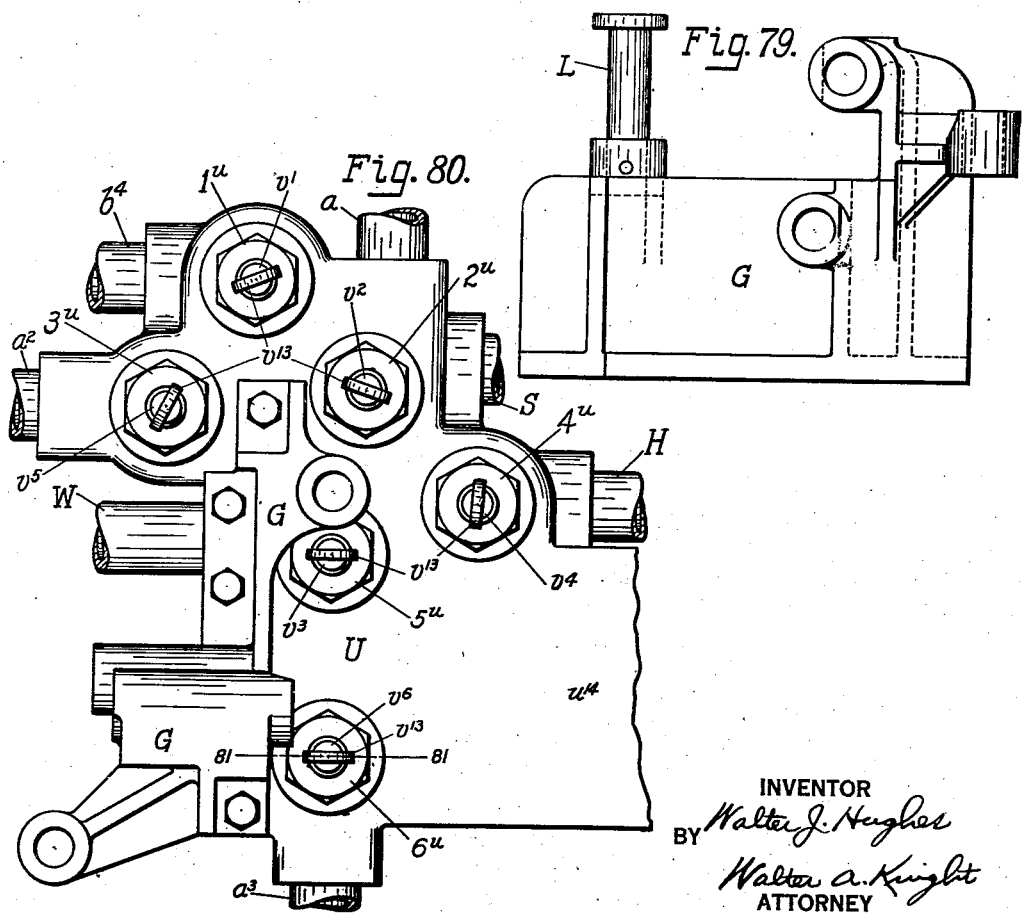
Fig. 79.
Fig. 80.
INVENTOR
Walter J. Hughes
BY
Walter A. Knight
ATTORNEY Aug. 20, 1935.  W. J. HUGHES  2,012,194
WATER SOFTENING APPARATUS
Filed June 6, 1927  21 Sheets-Sheet 21

INVENTOR
Walter J. Hughes
BY Walter A. Knight
ATTORNEY

Patented Aug. 20, 1935

2,012,194

UNITED STATES PATENT OFFICE 2,012,194

WATER SOFTENING APPARATUS

Walter J. Hughes, Chicago, Ill., assignor, by mesne assignments, to The Permutit Company (1934), Wilmington, Del., a corporation of Delaware Application June 6, 1927, Serial No. 196,950

22 Claims. (Cl. 210—24)

My invention relates to water softening apparatus using base exchange silicates, commonly called zeolites, as the water softening agent; and more particularly to means for automatically operating the valve means for controlling the flow of liquids through the zeolite bed in the apparatus. Zeolite water softeners may operate with either upward or downward flow of water in the softening phase; and may or may not have a preliminary filter in series; this depending on the water to be treated.

In operating such apparatus by downward flow of the hard water to be softened through the zeolite bed, the hard water supply valve must be opened to admit the water to be softened above the zeolite bed, and the valve opened which allows soft water to flow out of the apparatus below the bed, all other valves being closed. When the zeolites have been exhausted and when back-washing is required to flush out and carry away impurities these two valves must be closed. Backwashing is sending a current of water through the bed in a reverse direction (in this case, upward) for the purpose of detaching and carrying away foreign matter and slimy accumulations and of lifting and classifying the granules. To back-wash and stir up the bed a valve must be opened to allow water to enter the apparatus below the bed, and another valve opened to allow the back-wash water to flow to waste from above the zeolite bed. When back-washing has been completed these two valves must be closed. To regenerate the zeolite bed a valve must be opened to permit the regenerating fluid, usually common salt brine, to flow into the apparatus either above or below the bed, depending upon whether the brining is to be downward or upward, and another valve is opened on the opposite side of the bed to allow the spent brine to flow to waste. When regeneration has been completed, the valve through which brine was admitted must be closed. Residual brine is removed and the zeolites rinsed with water. To rinse the zeolite bed free of brine a valve is opened to admit fresh water, and if the flow of rinsing water is to be in the same direction as the flow of brine, the rinsing water inlet will be on the same side of the bed as the brine inlet, and the spent brine outlet valve will be left open to carry the rinsing water to waste. The rinsing out is generally done with hard water but may be done with soft water. When the zeolite bed has been rinsed free of brine the valve controlling the flow of liquid to waste is closed and if the washing out flow has been downward through the bed and hard water has been used to rinse the bed free of brine, the wash water valve is left open as it is supplying the water that is to be softened during the next step. The soft water outlet valve is now opened and softening of hard water is again begun.

Whether a given apparatus employs downflow or upflow in the water softening step and in the brining and rinsing out steps the chemical reactions of the zeolite are the same, that is, hard water is softened in the first mentioned step and the exhausted zeolite bed is revivified and also cleansed in the brining and rinsing out steps.

There are, however, many mechanical or physical differences in operation, and especially in the regeneration and cleansing phases, between upflow softening and downflow softening. In upflow softening, considerable attention to detail is required to secure a satisfactory operation in the various phases. Obviously with upflow softening an upward flow in a softening phase is not a "backwash." The softening rate in an upflow softener may correspond to the backwash rate of flow in the downflow softener and it is commonly necessary for various reasons to operate at such a speed that the water to be softened exercises lifting functions, and special washings for stratifying the layers of zeolite then may not be necessary. With the water lifting and spacing the grains, moderately fine matter in suspension may pass through the bed without arrest, and there then will be practically no filtering action; the bed performs only its chemical functions. However, even in such a case there is commonly an accumulation of slime on the granules toward the entering face and an accumulation of slime and suspended matter in the water distributing system at the entering face. These accumulations must be removed from time to time and this is mostly attempted by a downward flushing operation. Very often brining as well as rinsing is carried out downwardly.

Brining alone will not accomplish the desired flushing out operation, since the amount of the salt solution and its rate of flow through the bed is comparatively small; therefore, the flushing out of accumulated dirt from the distributing system will be done largely by the downflowing rinsing water, which then accomplishes a double purpose. It rinses out the salt solution from the bed and cleanses the lower part of the bed and the distributing system by flushing out accumulated dirt. There, however, is no saving accomplished by making double use of the rinsing water in an upflow softener, because the hard water is left in the upper part of the softener after the salt solution has been rinsed out and the dirt flushed out from the lower part of the bed, and this hard water must be replaced by soft water before the top of the softener can be connected to the soft water supply line. This is accomplished by passing hard water upwardly through the softener and running the water outflowing at the top to waste as long as it is hard. With downward softening the uniform distribution of the water during softening, and the cleansing and brining operations become simpler.

In either case if the valves are manually operated a substantial amount of labor is required, and as time must elapse to complete the several steps, a considerable amount of the time of the attendant will be consumed in terminating the water softening flow, effecting revivification of the zeolite bed and re-establishing the water softening flow.

The principal object of the present invention is to provide automatic means for operating the valve means for controlling and changing the flows of liquids through the zeolite bed at the times and in the order needed to carry out the several steps above enumerated. Such an apparatus is automatic in its operation. In such apparatus when a predetermined quantity of the water to be softened or of that which has been softened has flowed through the control means, a valve is automatically opened and another closed causing the apparatus to cease to operate to soften and supply water, and in some installations including residences this may cause great inconvenience at that particular time, as during the taking of a shower bath, or while the laundry work is being done. Of course if suitable plumbing equipment has been provided, hard water or soft water from a reserve supply may be used while the exhausted zeolites are being regenerated and put in condition to again soften water.

I provide means for avoiding this inconvenience, accomplishing another object of my invention, which is to provide such a water softening mechanism as when the metering mechanism is omitted or by-passed, requires some manual act at the end of the water softening step, as the throwing of a switch, before the automatic valve actuating means is set in motion to effect revivification. When set in motion, the several steps of brining, rinsing and removing hard water from the softener casing, will be consecutively taken until the apparatus has resumed the softening of water.

Another object of my invention is to provide positive mechanical means for opening, or for both opening and closing, valves that control the several flows of liquid through the zeolite bed. The practical importance of positive control is very great. Where hydraulic valves are used their operation depends upon a differential of pressure and therefore they are inefficient at low pressures. Because of the use of positive mechanical means for opening the valves, a correct and uniform water softening flow period is established.

In some devices the valves are opened and closed by hydraulic cylinders in which the movement of pistons may not be fully positive due to friction, corrosion, etc., or the valves may be opened or closed by a mechanism actuated by a water motor in which the movement of a rotor or piston may not be fully positive under all conditions, such as too low water pressure, friction, corrosion, etc. In the present invention the valves are opened and closed positively by direct power as from a constant speed electric motor mechanically connected to the valves as by a driven cam shaft with individual valve operating cams. In zeolite water softening apparatus corrosion from the brine adds substantially to uncertainty of operation where non-positive flow control means are employed.

Another object of my invention is to provide independent, substantially constant speed power means for driving the cams, ensuring adequate and unvarying timing of the several regeneration flows. Such power means is provided in an electric motor of a usual commercial type.

Some of the operations should have greater flows than others and my invention makes this possible by so shaping the several cam points as to open the valves to whatever extent is required to produce the desired flow.

A preferred form of my invention for domestic use is a pressure system water softener in which the water being softened flows upwardly through the zeolite bed, and is here shown in Figs. 1 to 26 inclusive in which:—

Figure 1 is a front elevation of said zeolite water softening apparatus, with the base and lower part of both tanks broken away;

Fig. 2 is a top plan view of the same;

Fig. 3 is a vertical section on the line 3—3 of Fig. 2 with parts of the casing for the valves broken away and in section to show means for opening and closing the valves, and with part of the switch box cover broken away to expose the switch mechanism;

Figure 17:
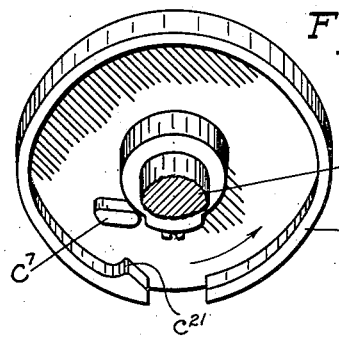
Figure 18:
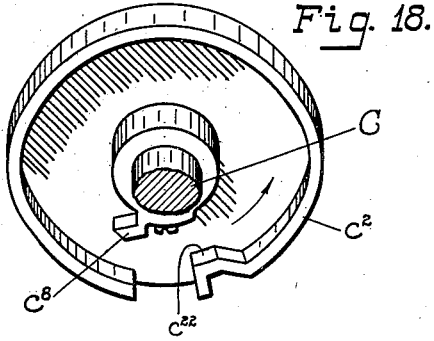
Figure 19:
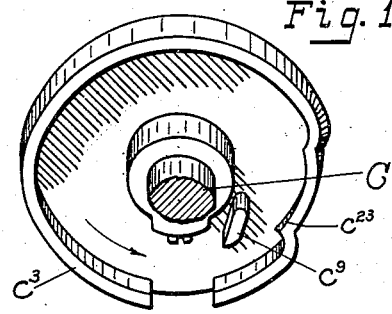
Figure 20:
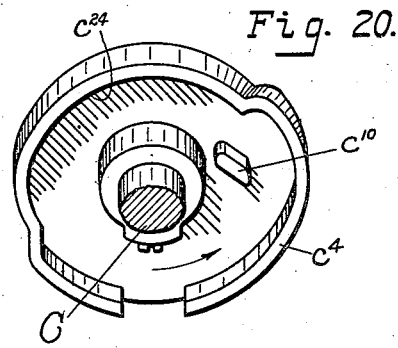
Figure 21:
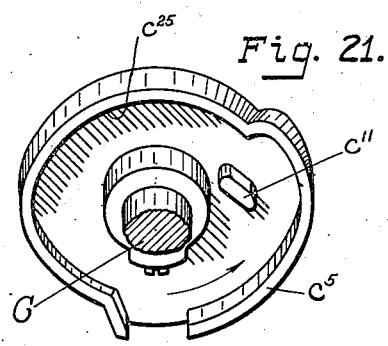
Figure 22:
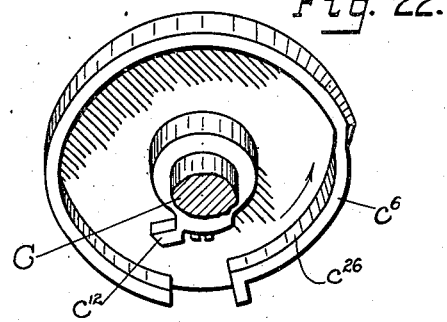
Figure 23:
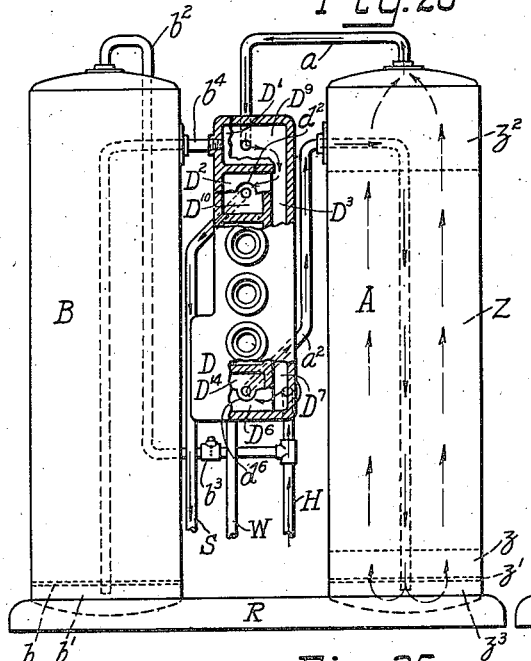
Figure 24:
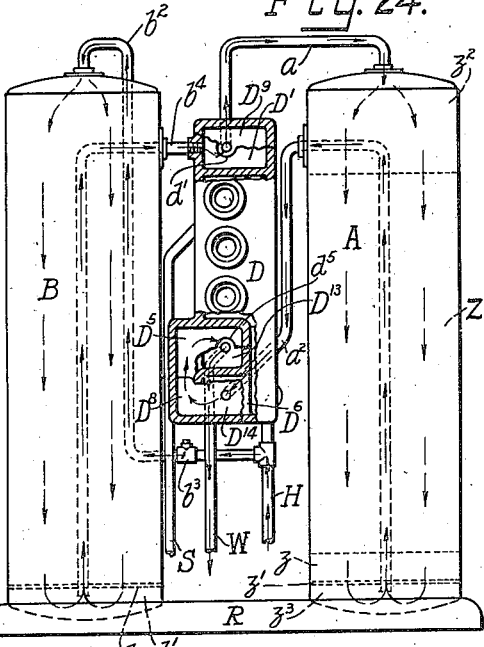
Figure 25:
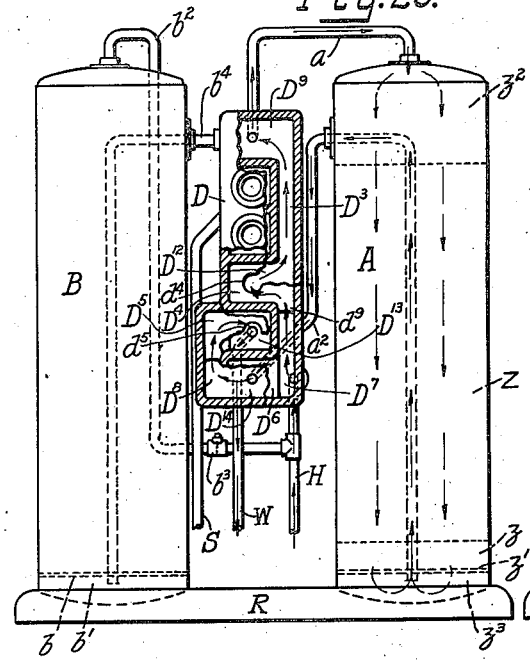
Figure 26:
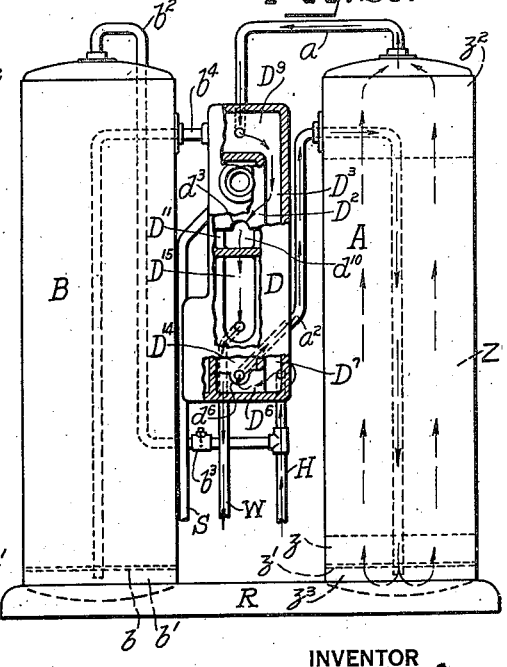

Fig. 4, a detail, is a section through the meter on the line 4—4 of Fig. 3;

Fig. 5, a detail of a switch operating cam, is a section on the line 5—5 of Fig. 3;

Fig. 6, a detail, is a front elevation of the casing for the valves;

Fig. 7 is a back elevation of the same;

Fig. 8 is a side elevation of the same, with the walls forming chamber $D^{15}$ in vertical section;

Fig. 9 is a vertical section on the line 9—9 of Fig. 8;

Fig. 10 is a vertical section on the line 10—10 of Fig. 8;

Fig. 11 is a cross section on the line 11—11 of Fig. 6;

Fig. 12 is a cross section on the line 12—12 of Fig. 6;

Fig. 13 is a cross section on the line 13—13 of Fig. 6;

Fig. 14 is a cross section on the line 14—14 of Fig. 6;

Fig. 15 is a cross section on the line 15—15 of Fig. 6;

Fig. 16 is a cross section on the line 16—16 of Fig. 6;

Fig. 17, a detail, is a perspective of the cam that opens the uppermost valve, designated as 1;

Fig. 18, a detail, is a perspective of the cam that opens the valve next to the top one, designated as 2;

Fig. 19, a detail, is a perspective of the cam that opens the valve designated as 3;

Fig. 20, a detail, is a perspective of the cam that opens the valve designated as 4;

Fig. 21, a detail, is a perspective of the cam that opens next to the lowermost valve, designated as 5;

Fig. 22, a detail, is a perspective of the cam that opens the lowermost valve, designated as 6;

Fig. 23 is a diagrammatic elevation of the tanks and piping of the apparatus, with such portions of the casing for the valves sectioned as are necessary to show such chambers open to view as are used in the flow of the water during the period when softening is taking place;

Fig. 24 is a similar view, with such chambers open as are used in the flow of brine during the period when the zeolite bed is being regenerated;

Fig. 25 is a similar view, with such chambers open as are used in the flow of wash water when the zeolite bed is being rinsed free of spent brine by passing the wash water downwardly through it;

Fig. 26 is a similar view, with such chambers open as are used in the flow of water upwardly through the tank to remove and carry to waste the hard water remaining above the zeolite bed, when the washing operation shown in Fig. 25 is completed;

Another form of my invention for domestic use, also pressure system up-flow apparatus but in which the valves are opened by pushing instead of pulling, is here shown in Figs. 27 to 50 inclusive in which:—

Figure 30:
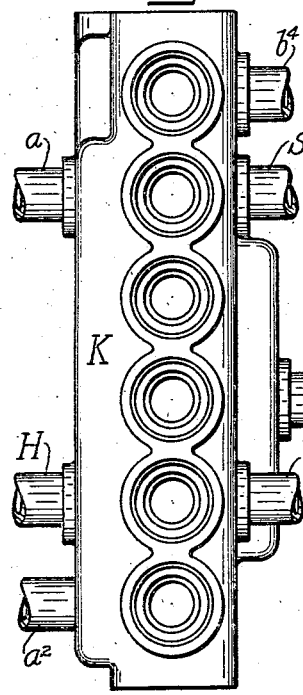
Figure 32:
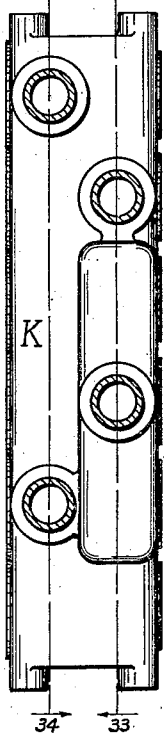
Figure 29:
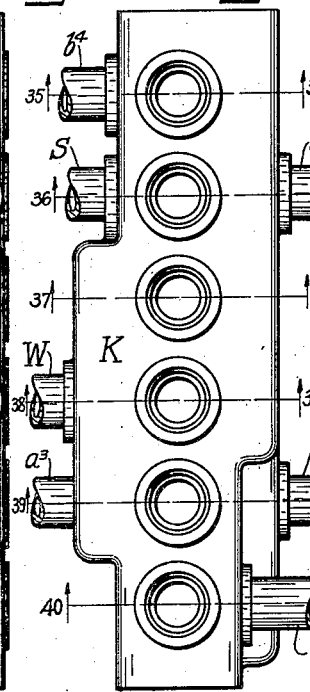
Figure 31:
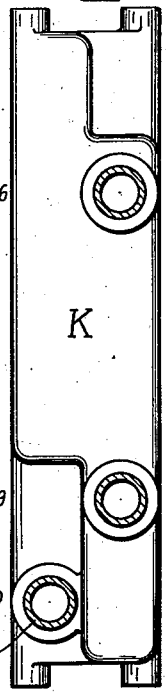
Figure 33:
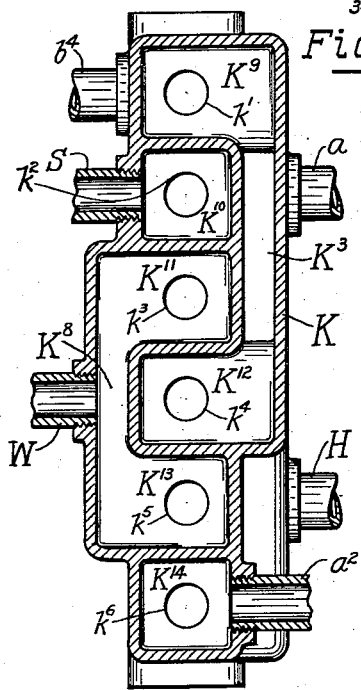
Figure 34:
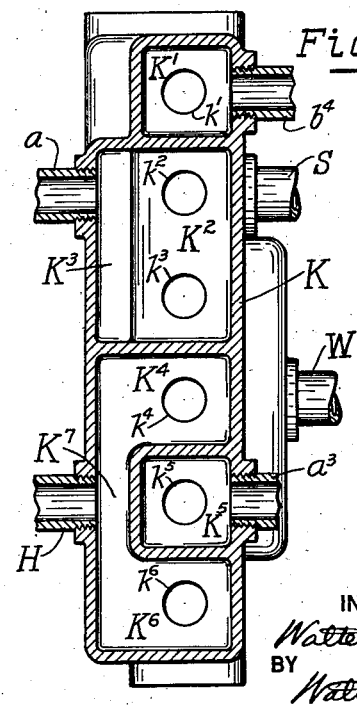
Figure 35:
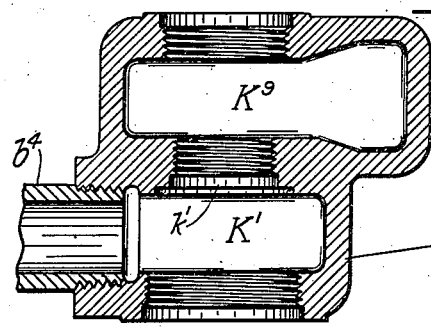
Figure 36:
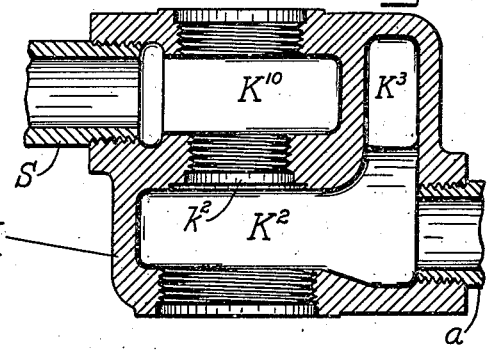
Figure 37:
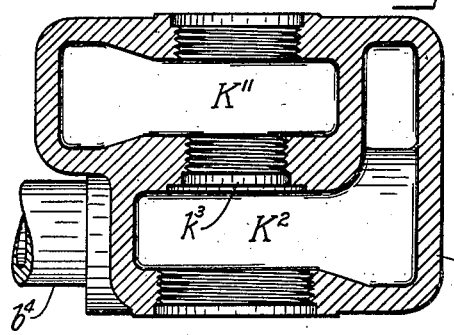
Figure 38:
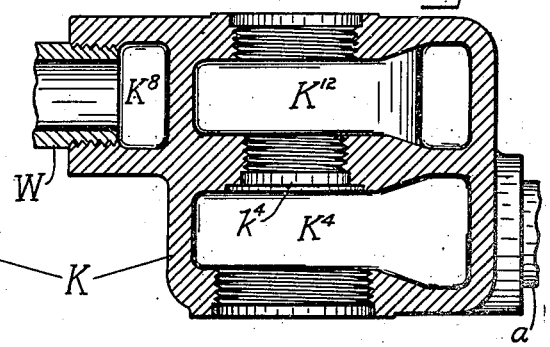
Figure 39:
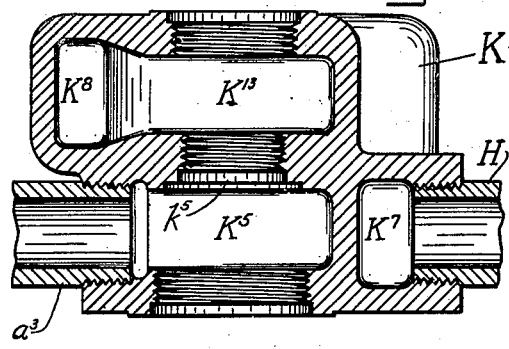
Figure 40:
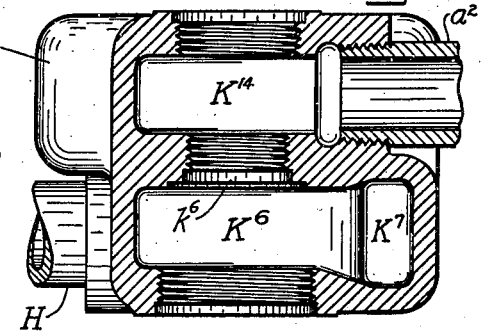
Figure 41:
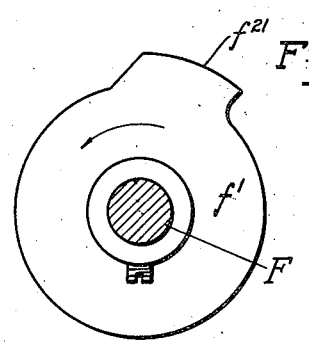
Figure 42:
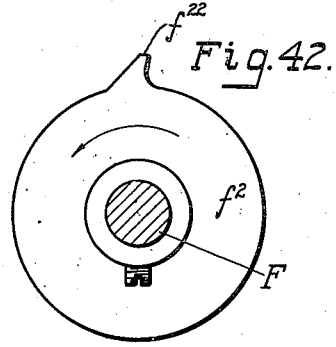
Figure 43:
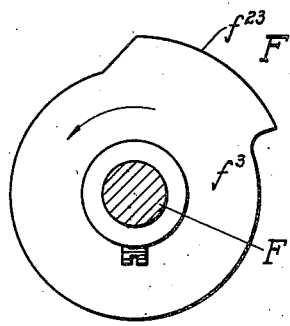
Figure 44:
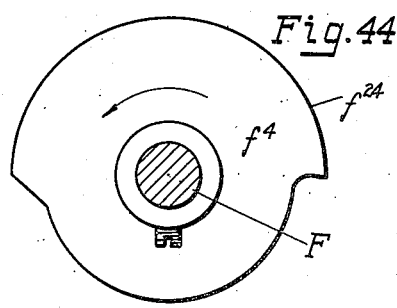
Figure 45:
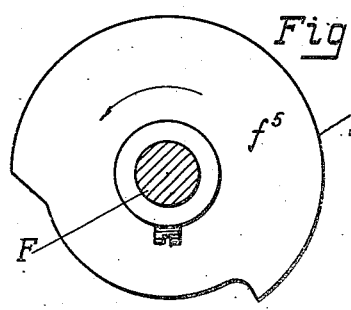
Figure 46:
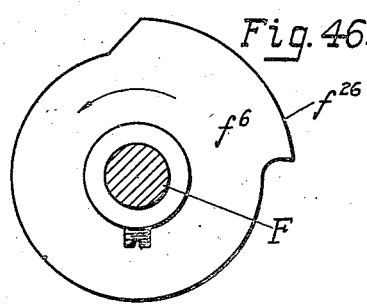
Figure 47:
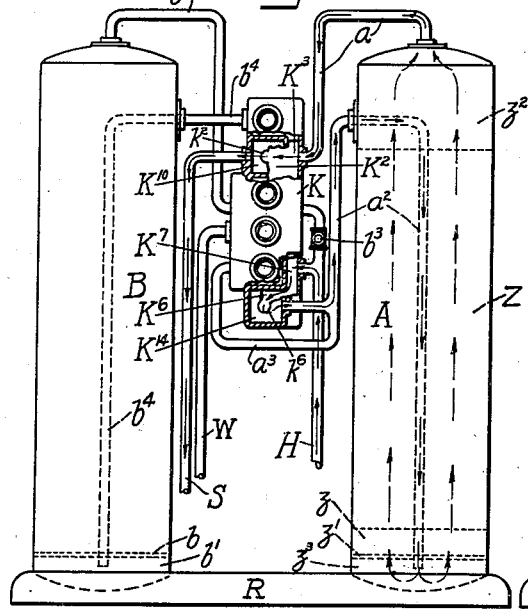
Figure 48:
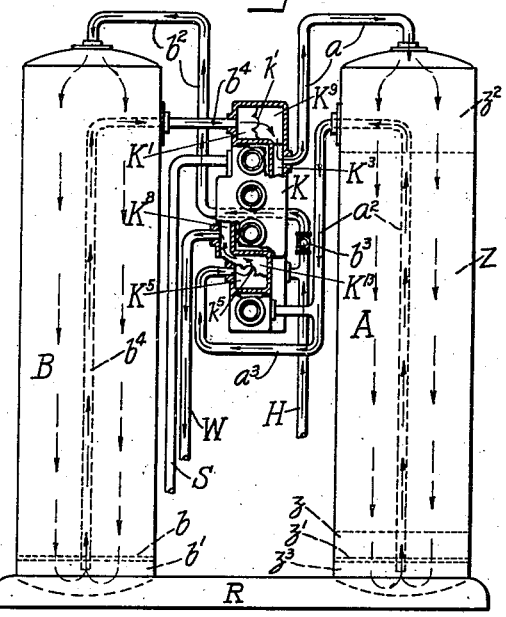
Figure 49:
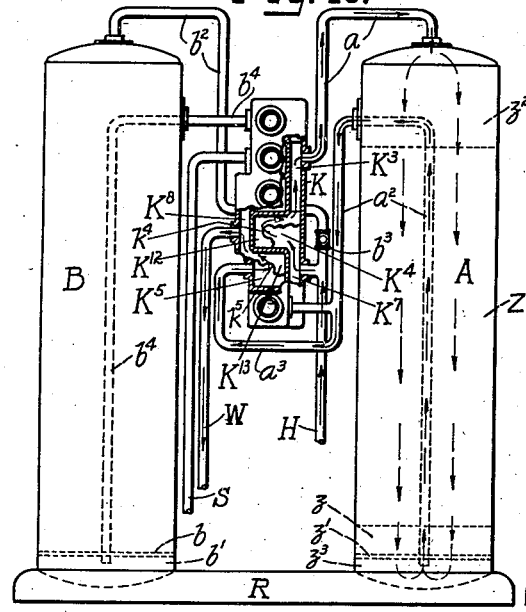
Figure 50:
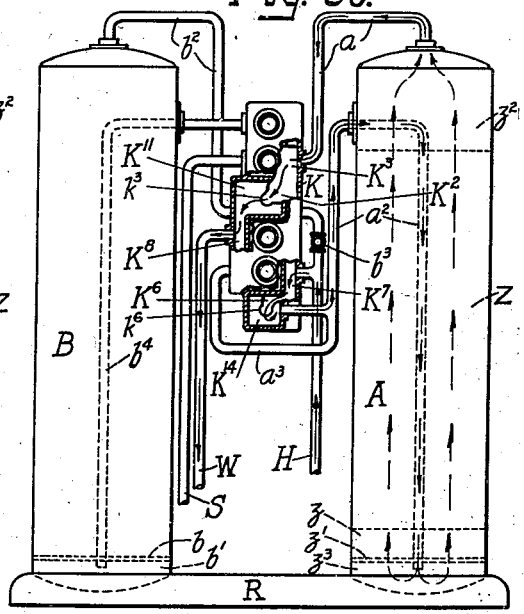

Fig. 27 is a view in perspective of the apparatus from the front, with the base and parts of the tanks broken away, and shown without meter;

Fig. 28 is a section on the line 28—28 of Fig. 27;

Fig. 29, a detail, is a front elevation of the casing for the valves;

Fig. 30 is a back elevation of the same;

Fig. 31 is an elevation of the side on the right of Fig. 29;

Fig. 32 is an elevation of the side on the left of Fig. 29;

Fig. 33 is a vertical section on the line 33—33 of Fig. 32;

Fig. 34 is a vertical section on the line 34—34 of Fig. 32;

Fig. 35 is a cross section on the line 35—35 of Fig. 29;

Fig. 36 is a cross section on the line 36—36 of Fig. 29;

Fig. 37 is a cross section on the line 37—37 of Fig. 29;

Fig. 38 is a cross section on the line 38—38 of Fig. 29;

Fig. 39 is a cross section on the line 39—39 of Fig. 29;

Fig. 40 is a cross section on the line 40—40 of Fig. 29;

Fig. 41, a detail, is a bottom plan view of the cam that opens the uppermost valve, designated as 1ª;

Fig. 42 is a bottom plan view of the cam that opens the valve next to the uppermost one, designated as 2ª;

Fig. 43 is a bottom plan view of the cam that opens the valve designated as 3ª;

Fig. 44 is a bottom plan view of the cam that opens the valve designated as 4ª;

Fig. 45 is a bottom plan view of the cam that opens next to the lowermost valve, designated as 5ª;

Fig. 46 is a bottom plan view of the cam that opens the lowermost valve, designated as 6ª;

Fig. 47 is a diagrammatic elevation of the tanks and piping of the apparatus, with such portions of the casing for the valves sectioned as are necessary to show such chambers open to view as are used in the flow of the water during the period when softening is taking place;

Fig. 48 is a similar view with such chambers open as are used in the flow of brine during the period when the zeolite bed is being regenerated;

Fig. 49 is a similar view, with such chambers open as are used in the flow of wash water when the zeolite bed is being rinsed free of spent brine by passing the wash water downwardly through it;

Fig. 50 is a similar view, with such chambers open as are used in the flow of water upwardly through the tank to remove and carry to waste the hard water remaining above the zeolite bed, when the washing operation shown in Fig. 49 is completed;

A form of my invention for industrial use, also a pressure system apparatus, but having downflow of the water being softened, has valves operated by pushing, and is here shown in Figs. 51 to 65 inclusive, in which:—

Figure 62:
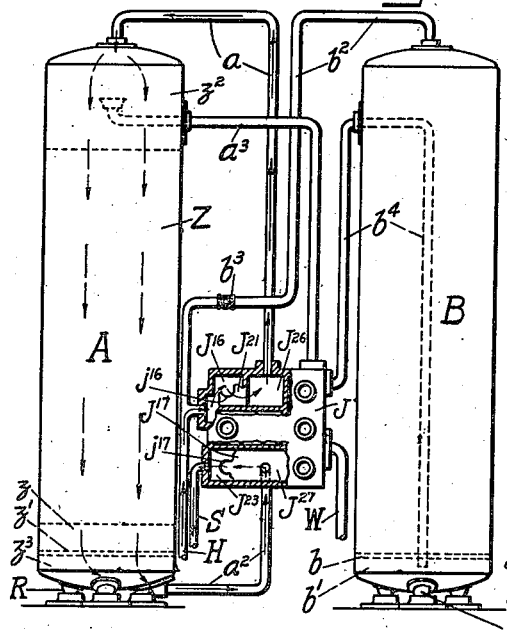
Figure 64:
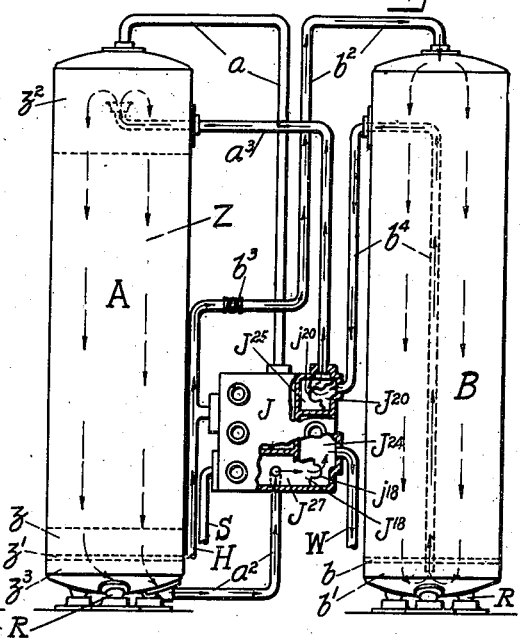
Figure 65:
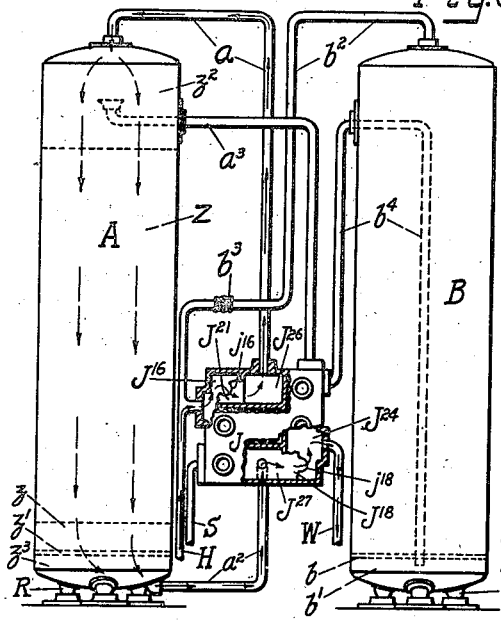
Figure 63:
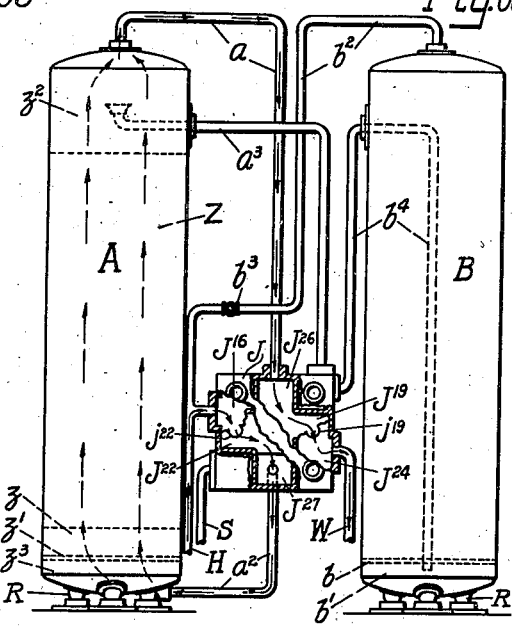

Fig. 51 is a front elevation of the apparatus, with tanks and piping broken across to shorten and with a part of the softener tank broken away at the side;

Fig. 52 is a side elevation of the operating mechanism, and attendant parts, a part only of the softener tank being shown;

Fig. 53, a detail, is a top plan view of the casing for the valves;

Fig. 54 is an under plan view of the same;

Fig. 55 is an elevation of the side on the right of Fig. 53;

Fig. 56 is an elevation of the side on the left of Fig. 53;

Fig. 57 is a longitudinal section on the line 57—57 of Fig. 56;

Fig. 58 is a longitudinal section on the line 58—58 of Fig. 56;

Fig. 59 is a cross section on the line 59—59 of Fig. 52;

Fig. 60 is a cross section on the line 60—60 of Fig. 52;

Fig. 61 is a cross section on the line 61—61 of Fig. 52;

Fig. 62 is a diagrammatic elevation of the tank and piping of the apparatus with the casing for the valves shown in vertical instead of horizontal position and such portions of it sectioned as are necessary to show such chambers open to view as are used in the flow of the water downwardly through the zeolite bed during the period when softening is taking place;

Fig. 63 is a similar view, with such chambers open as are used during the backwashing operation, when water is flowing upwardly through the zeolites to break up and wash out the dirt accumulation composed of foreign matter in suspension, caught and held by the zeolite bed while it has been acting as a filter as well as a water softener during downward softening;

Fig. 64 is a similar view, with such chambers open as are used in the flow of brine downwardly through the zeolite bed during the period when the zeolites are being regenerated;

Fig. 65 is a similar view, with such chambers open as are used in the flow of water downwardly through the zeolite bed to rinse the zeolites free of spent brine;

Another form of my invention for domestic use, also a pressure system, up-flow apparatus, but in which the cams are formed as parts of concentric circles on the underside of a disk, in which the valves are opened by pushing instead of pulling, is here shown in Figs. 66 to 85, in which:—

Figure 82:
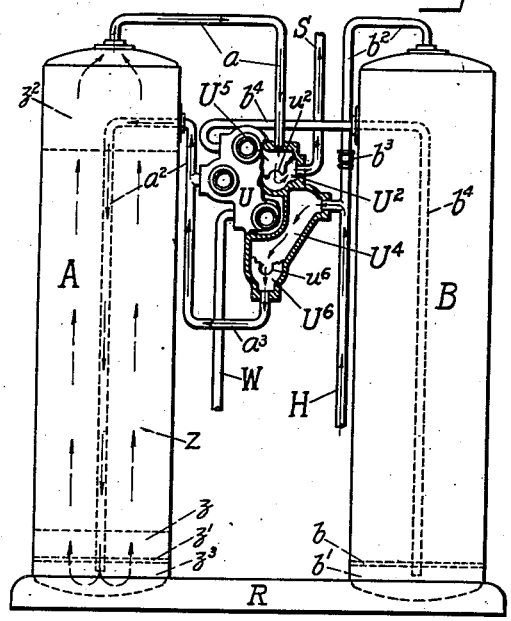
Figure 83:
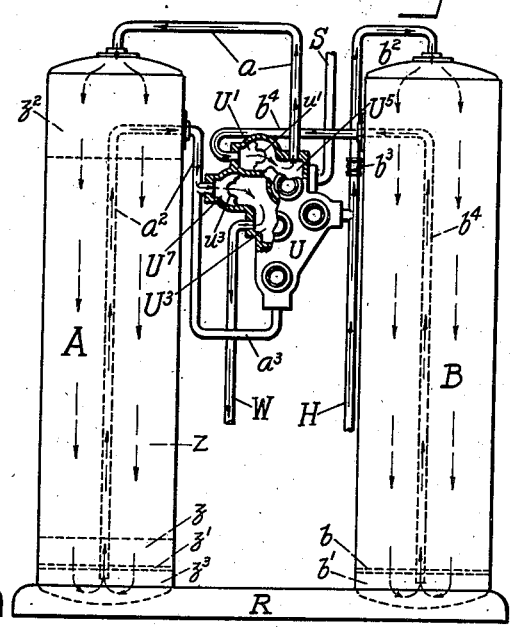
Figure 84:
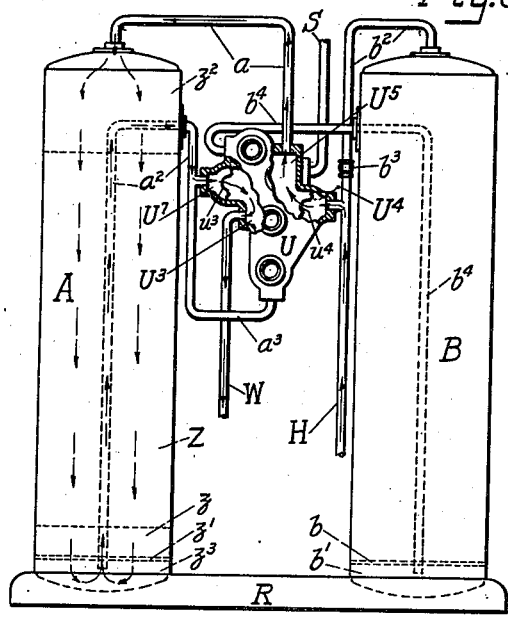
Figure 85:
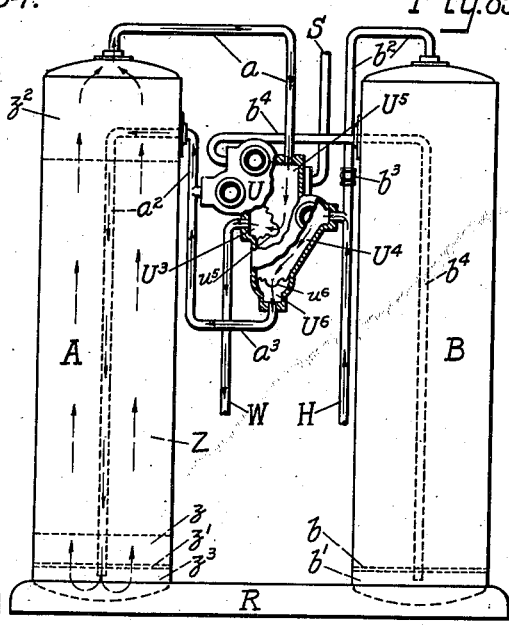

Fig. 66 is a front elevation of said apparatus with both tanks omitted;

Fig. 67 is a top plan view of same;

Fig. 68 is a top plan view showing the apparatus with the connections to the water softener and brine tanks;

Fig. 69, a detail, is a top plan view of the casing for the valves;

Fig. 70 is an under plan view of the same;

Fig. 71 is a view of the side on the right of Fig. 69;

Fig. 72 is a view of the side on the left of Fig. 69;

Fig. 73 is a horizontal section on the line 73—73 of Fig. 72;

Fig. 74 is a horizontal section on the line 74—74 of Fig. 72;

Fig. 75 is a vertical section on the line 75—75 of Fig. 69;

Fig. 76 is a vertical section on the line 76—76 of Fig. 69;

Fig. 77 is a vertical section on the line 77—77 of Fig. 69;

Fig. 78, a detail, is a perspective of the disk and cams that open the valves designated as $1^u$, $2^u$, $3^u$, $4^u$, $5^u$, and $6^u$;

Fig. 79, a detail, is a side elevation of the gear housing and cam shaft;

Fig. 80 is a top plan view of the valve casing and gear housing, showing the position of the valves;

Fig. 81 is a vertical section on the line 81—81 of Fig. 80;

Fig. 82 is a diagrammatic elevation of the tanks and piping of the apparatus, with such portions of the casing for the valves sectioned as are necessary to show such chambers open to view as are used in the flow of the water during the period when softening is taking place;

Fig. 83 is a similar view, with such chambers open as are used in the flow of brine during the period when the zeolite bed is being regenerated;

Fig. 84 is a similar view, with such chambers open as are used in the flow of wash water when the zeolite bed is being rinsed free of spent brine by passing the wash water downwardly through it;

Fig. 85 is a similar view, with such chambers open as are used in the flow of water upwardly through the tank to waste to remove and carry to waste the hard water remaining above the zeolite bed, when the washing operation shown in Fig. 85 is completed.

Referring now to the drawings, Figures 1 to 26; A is a container having a bed of zeolites Z therein, resting directly on the usual supporting bed of gravel $z$, which is in turn supported on a screen $z^1$. There is a space $z^2$ above the zeolite bed, which is preferably unconfined at the top to permit upward movement of the zeolite grains in upward softening or to permit after downward softening a stirring of the bed by violent back-washing so as to break up the dirt accumulation and wash out the accumulated foreign material. Below the screen $z^1$ is a space $z^3$.

A pipe $a$ is connected at one end with the tank A at or near its top, and at the other with the casing D for the valves. A pipe $a^2$ is connected with the casing D at one end and passes through the wall of the tank A near the top of said tank, with which it makes a leak tight joint, and extends down into said tank, preferably substantially axially thereof, and terminates below the screen $z^1$. A removable fill cap $A^1$ is adapted to be clamped in position so as to make an air tight joint.

B is a brine tank with a screen $b$ near the bottom, to support the undissolved salt and a space $b^1$ is under the screen. A pipe $b^2$ is connected at one end with the tank B at or near its top, and at the other end with a hard water supply line H. In the pipe line $b^2$ is a check valve $b^3$ to prevent brine from flowing from the tank B into the pipe H. A pipe $b^4$ is connected with the casing D at one end and passes through the wall of the tank B, with which it makes a leak tight joint, near the top of said tank and extends down into said tank preferably substantially axially thereof, and terminates below the screen $b$. A removable fill cap $B^1$ is adapted to be clamped in position so as to make a leak tight joint.

Both tanks A and B are supported on a base R.

A soft-water supply pipe S is connected at one end to the casing D and at the other end to a flow meter M and the soft water line is continued out of the meter by pipe $S^1$.

A waste pipe W is connected at one of its ends to the casing D and at the other is open to the sewer.

The casing D has 15 chambers, of which chambers $D^1$, $D^2$, $D^4$, $D^5$, and $D^6$ are at the front of the casing; chambers $D^9$, $D^{10}$, $D^{11}$, $D^{12}$, $D^{13}$, and $D^{14}$ are at the back of the casing on the inside of the main wall thereof, and chamber $D^{15}$ is formed by a portion which is bulged out beyond the main surface of the back of the casing, while chambers $D^3$ and $D^7$ are at the right side and chamber $D^8$ is at the left side of the casing when seen from the front, as in Fig. 6.

Chamber $D^1$ has a port $d^1$ connecting it with chamber $D^9$ and this port is controlled by valve 1. The brine pipe $b^4$ connects chamber $D^1$ with the brine tank B.

Chamber $D^2$ has a port $d^2$ connecting it with chamber $D^{10}$, which port is controlled by valve 2. Chamber $D^{10}$ is connected with the soft water pipe S. Chamber $D^2$ also has a port $d^3$ connecting it with chamber $D^{11}$ and this port is controlled by valve 3. Chamber $D^{11}$ is in open communication with chamber $D^{15}$. Chambers $D^{10}$ and $D^{11}$ lie directly behind chamber $D^2$. Chamber $D^2$ at the front of the casing and chamber $D^3$ at its side are in open communication at the corner of the casing, and therefore, in fact, together form a single chamber, L-shaped in cross section as shown in Figs. 12 and 13. Chamber $D^3$ has no port, is in open communication at the back at its top with chamber $D^9$, which chamber is directly behind chamber $D^1$. Chamber $D^3$ is in open communication at the back at its bottom with the chamber $D^{12}$, which extends across the entire back of the casing directly behind the chamber $D^4$.

Chamber $D^4$ has a port $d^4$ connecting it with chamber $D^{12}$, which port is controlled by valve 4. Chamber $D^4$ is in open communication with chamber $D^7$. Hard water pipe H is connected with chamber $D^7$.

Chamber $D^5$ has a port $d^5$ controlled by valve 5, connecting it with chamber $D^{13}$, which lies directly behind a portion of chamber $D^5$. Chamber $D^{13}$ is in open communication with chamber $D^{15}$ and waste pipe W is connected with chamber $D^{15}$ to carry brine and wash water to the sewer. Chamber $D^5$ is in open communication with chamber $D^8$.

Chamber $D^6$ is in open communication with chamber $D^7$ and has port $d^6$ controlled by valve 6 connecting it with chamber $D^{14}$, which lies directly behind chamber $D^6$. Chamber $D^{14}$ is at the back of the casing and is in open communication at the corner of the casing with chamber $D^8$ at the side of the casing and the two chambers together form in fact, a single L-shaped chamber, as shown in Figure 16. Pipe $a^2$ connects chamber $D^{14}$ with tank A.

The valves 1, 2, 3, 4, 5, and 6, have stems $v^1$, $v^2$, $v^3$, $v^4$, $v^5$, and $v^6$, respectively, with attached forked cam roll holders $v^7$, $v^8$, $v^9$, $v^{10}$, $v^{11}$, and $v^{12}$, respectively, each having a cam roll $v^{13}$ rotatably mounted on a stud $v^{14}$ therein. Each of these valves is normally held in closed position by a spring $x$ and resilient sylphon packing sleeve $x^1$.

The meter M may be of any suitable flow type, but the casing is extended at one side at $m$, the soft water inlet pipe S being secured thereto to admit water to the inlet passage $m^1$, and the soft water outlet pipe $S^1$ being secured thereto to carry away water from the outlet passage $m^2$. A by-pass $m^6$ from inlet passage $m^1$ to outlet passage $m^2$ is controlled by a plug valve $m^3$ adapted to be manipulated through the valve lever $m^4$. If the hardness of the water being softened is so great that the entire volume if passed through the meter is only sufficient to throw the switch T, hereinafter to be described, at the proper time, then the valve $m^3$ is turned so as to leave the passage $m^5$ therethrough, fully open as shown in Fig. 4. If the water being treated is not so hard then the valve $m^3$ is rotated so as to by-pass a portion of the water, directly from passage $m^1$ to passage $m^2$. The less hard is the water being treated, the more the inlet passage $m^1$ is closed and the more the by-pass $m^6$ is opened, so as to prolong the time during which the step of water softening is carried on. If it is desired to cut out the meter M altogether, at any time, the valve $m^3$ is rotated so as to completely close the inlet passage $m^1$ and by-pass all the soft water through the passage $m^6$.

The meter M causes the shaft $m^7$ to rotate very slowly, the rate of rotation being governed by the quantity of water passing through the meter. Fixed to shaft $m^7$ is a lever $m^8$, carrying an upwardly protruding pin $m^9$.

To the bottom and top of the casing D are secured brackets $d^{14}$ and $d^{15}$ respectively, which project forwardly beyond the ends of the valve stems and their attached cam roll holders; and these brackets carry journals $d^{16}$, $d^{17}$ respectively in which are journalled the vertical cam shaft C.

To the shaft C are fixed cams $c^1$, $c^2$, $c^3$, $c^4$, $c^5$, and $c^6$ with tracks on the inner faces of their peripheral flanges on which bear the cam rolls $v^{13}$ of the cam roll holders $v^7$, $v^8$, $v^9$, $v^{10}$, $v^{11}$, and $v^{12}$ respectively, and these cams are adapted to open their respective valves 1, 2, 3, 4, 5, and 6. Lugs $c^7$, $c^8$, $c^9$, $c^{10}$, $c^{11}$, and $c^{12}$ are each adapted to be contacted by one of the cam rolls $v^{13}$ and thus tend to cooperate with the springs and sylphon packing sleeves in seating the valves.

An electric motor E is mounted on the bracket $d^{15}$, and its shaft $e$ is resiliently connected by spring $e^1$ to driving shaft $g$ journalled in the housing G mounted on bracket $d^{15}$. A worm $g^2$, fixed to shaft $g$ meshes with and drives worm gear $g^3$, which in turn is fixed to shaft $g^4$ journalled in the housing G, and bracket $d^{15}$. To the shaft $g^4$ is fixed a worm $g^5$, which meshes with and drives worm gear $g^6$, which in turn is fixed to shaft $g^7$ also journalled in the housing G. Fixed to shaft $g^7$ is a worm $g^8$, which meshes with and drives worm gear $g^9$, which in turn is fixed to the cam shaft C.

Below the journal $d^{16}$ is a cam $c^{13}$ fixed to the shaft C. The cam $c^{13}$ is similar in shape to the cam $c^{14}$ mounted at the lower end of cam shaft C, loose thereon and held in position by washer $c^{15}$ and nut $c^{16}$. On the lower side of cam $c^{14}$ are bosses $c^{17}$, $c^{18}$, which form between them a track for the top of the pin $m^9$ and this pin rotates cam $c^{14}$. The meter M is mounted on a bracket $d^{18}$ formed as a part of the bracket $d^{14}$.

A switch box T is secured to the bracket $d^{18}$, and in it is mounted the switch mechanism. The switch mechanism consists of a fixed contact point $t$, and blade $t^1$, pivoted at $t^2$ and adapted to be thrown from the non-contacting position shown in Fig. 3, to contacting position by pressure of the coiled spring $t^3$, when the hooked push-rod $t^4$ passes over the point $c^{19}$ of its cam $c^{14}$ and falls into the depression $c^{20}$. When so thrown the switch will remain closed, that is with the blade $t^1$ in contact with the point $t$, until the hooked push rod $t^5$ passes off the point of its cam $c^{13}$ and enters its depression by the pressure of the coiled spring $t^6$, when the parts will again be in the position shown in Fig. 3.

If all the soft water is being by-passed through the port $m^6$, the switch would never be automatically thrown into closed position as the meter M would not rotate the lever $m^8$ and hence the pin $m^9$ would not rotate the cam $c^{14}$. A hand lever $t^7$ is then used to close the switch, which will continue to be opened automatically as before described.

The switch is open as shown in Fig. 3 while the apparatus is softening water and the flow of liquids is as shown in Fig. 23. As the motor E is not then running the shaft C is at rest and all the valves will remain in the position shown in Fig. 3, until the switch T is closed.

As soon as the switch T is closed, the motor E starts running and rotates the shaft C very slowly through worms and gears $g^2$, $g^3$, $g^5$, $g^6$, $g^8$, and $g^9$.

During the water softening operation, the cam roll $v^{13}$ of valve 2 is on the point $c^{22}$ of cam $c^2$ opening that valve to allow softened water to flow from the tank A through pipe $a$, chamber $D^9$, chamber $D^3$, chamber $D^2$, port $d^2$, chamber $D^{10}$ and pipe S to the meter M and thence through pipe $S^1$ to service. At the same time the cam roll $v^{13}$ of valve 6 is on the point $c^{26}$ of cam $c^6$ opening that valve to allow hard water that is to be softened to flow from the pipe H through chamber $D^7$, chamber $D^6$, port $d^6$, chamber $D^{14}$ and pipe $a^2$ to the tank A. This valve setting establishes the conditions, shown in Fig. 23, which ensure the passage of hard water to be softened, upwardly through the zeolite bed Z; and the passage of the same water after it has been softened by the base exchange action of the zeolites, out of the softening tank and to service.

Rotation of the cam shaft C, which is always in the direction indicated by the arrow, Fig. 2 and of the arrows on the separate cams Figs. 17 to 22, causes the cam rolls of valves 2 and 6 to pass off the points $c^{22}$ and $c^{26}$ respectively, whereupon valves 2 and 6 are closed by the action of their springs $x$ and sylphons $x^1$, assisted by the action of the lugs $c^3$ and $c^{12}$ on the cam rolls of valves 2 and 6 respectively.

The cams $c^1$ and $c^5$ are so set on the cam shaft C in relation to cams $c^2$ and $c^6$ that immediately after the valves 2 and 6 have closed, cam roll $v^{13}$ of valve 1 passes onto the point $c^{21}$ of cam $c^1$ opening valve 1 to allow brine to flow from the tank B through pipe $b^4$, chamber $D^1$, port $d^1$, chamber $D^9$ and pipe $a$ to tank A. At the same time cam roll $v^{13}$ of valve 5 passes onto the point $c^{25}$ of cam $c^5$ opening valve 5 to allow spent brine to flow from the tank A through pipe $a^2$, chamber $D^{14}$, chamber $D^8$, chamber $D^5$, port $d^5$, chamber $D^{13}$, and pipe W to the sewer. This valve setting establishes the conditions, shown in Fig. 24, which ensure the passage of brine downwardly through the zeolite bed Z in the tank A, to regenerate the zeolites.

Further rotation of the cam shaft C causes the cam roll of valve 1 to pass off the point $c^{21}$ and allow the valve to be closed, by the action of its spring and sylphon assisted by the action of the lug $c^7$ on the cam roll of valve 1.

Immediately after the valve 1 has closed, valve 5 still remaining open, cam roll $v^{13}$ of valve 4 passes onto the point $c^{24}$ of cam $c^4$, opening valve 4 and allowing hard water to flow from pipe H through chamber $D^7$, chamber $D^4$, port $d^4$, chamber $D^{12}$, chamber $D^3$, chamber $D^9$, and pipe $a$ into tank A washing all residue of brine out of the casing D for the valves, and passing downwardly through the bed of zeolites Z in the tank A, rinses them free of brine and this wash water passes out of tank A through pipe $a^2$, chamber $D^{14}$, chamber $D^8$, chamber $D^5$, port $d^5$, chamber $D^{13}$ and pipe W, to the sewer. This valve setting establishes the conditions shown in Fig. 25, which ensure the passage of wash water downwardly through the zeolite bed and thence to waste.

Further rotation of the cam shaft C causes the cam rolls of valves 4 and 5 to pass off the points $c^{24}$ and $c^{25}$ respectively, and allow valves 4 and 5 to be closed by their springs and sylphons, assisted by the action of the lugs $c^{10}$ and $c^{11}$ on the cam rolls of valves 4 and 5 respectively.

Immediately after valves 4 and 5 have closed, the cam roll of valve 3 passes onto the point $c^{23}$ of cam $c^3$ opening valve 3 and allowing hard water above the zeolite bed in tank A to flow thence through pipe $a$, chamber $D^9$, chamber $D^3$, chamber $D^2$, port $d^3$, chamber $D^{11}$, chamber $D^{15}$ and pipe W to the sewer. At the same time the cam roll of valve 6 passes onto the point $c^{26}$ of cam $c^6$ opening valve 6 and allowing hard water to flow from pipe H, through chamber $D^7$, chamber $D^6$, port $d^6$, chamber $D^{14}$ and pipe $a^2$ into the tank A, and pass upwardly through said tank. This valve setting establishes the conditions, shown in Fig. 26, which ensure the passage of water upwardly through the zeolite bed to force out of tank A and to waste the body of hard water remaining above the zeolite bed after the bed has been rinsed free of brine by passing the hard wash water downwardly through it.

The zeolites have at this time been revivified and the apparatus may now be set to soften water. Further rotation of the cam shaft C causes the cam roll of valve 3 to pass off the point $c^{23}$ of cam $c^3$ allowing the valve 3 to be closed by the action of its spring and sylphon assisted by the pressure of the lug $c^9$ on the cam roll of valve 3. While this is taking place valve 6 remains open and the cam roll of valve 2 passes onto point $c^{22}$ of cam $c^2$ opening valve 2. When this water softening position of the valves has been re-established the rotation of cam shaft C has brought cam $c^{13}$ to the position where push-rod $t^5$ passes from the point of this cam to its recess throwing the switch T into open position and shutting off the motor E.

The shaft C continues at rest, during which time hard water to be softened is passing through the zeolite bed, until the switch is again thrown into closed position either by the meter and its attendant mechanism whenever a predetermined amount of soft water has flowed through said meter, or by throwing the hand lever $t^7$.

It will be understood that instead of providing means for softening upwardly, brining and rinsing downwardly and then forcing the hard water above the zeolite bed out of the casing upwardly as hereinbefore described; such changes may be made in the casing for the valves, in pipe connections and valves or any or all of them, as will supply means for softening, brining and rinsing upwardly, limiting the cycle to three flows; or for softening upwardly, brining downwardly, and rinsing upwardly, also limiting the cycle to three flows; or, if the water to be softened has no foreign matter in suspension, for all downward flows, also limiting the cycle to three flows; or for softening downwardly, succeeded by an upward backwashing step to break up the dirt accumulation and carry to waste the collected foreign matter caught and held on top of the zeolite bed in using it to accomplish mechanical filtration as well as water softening, and then follow this by downward brining and downward rinsing. All such changes are within the scope of my invention.

Referring now to the drawings, Figures 27 to 50:—In this modified form of the apparatus A is the container, Z the bed of zeolites, $z$ the bed of gravel, $z^1$ the screen on which the gravel rests, $z^3$ the space under said screen, $z^2$ the space above the zeolite bed, $a$ a pipe from tank A to the casing for the valves designated in this type as K, $a^2$ a pipe connecting casing K with tank A and extending downwardly thereinto; $A^1$ is a fill cap for the tank A, B is a brine tank, $b$ the screen near the bottom of the brine tank, $b^1$ the space under the screen, $b^2$ a pipe connecting tank B with hard water supply line H, $b^3$ a check valve in pipe line $b^2$, $b^4$ a pipe connecting the casing K and tank B and extending down into said tank below screen $b$; R is the base supporting tanks A and B; S is a soft water supply line leading out from casing K; W is a waste pipe connecting casing K with the sewer; the casing K has brackets $k^{14}$ at the bottom and $k^{15}$ at the top carrying journals $k^{16}$ and $k^{17}$ respectively, in which is journalled the vertical cam shaft designated in this type as F; E is the electric motor, $e$ its shaft, $e^2$ a coupling rotatably connecting shaft $e$ and drive shaft $g$; G is the housing for the gears, $g^2$ a worm fixed to shaft $g$, $g^3$ a worm gear driven by $g^2$ and fixed to shaft $g^4$, $g^5$ a worm on shaft $g^4$, which drives worm gear $g^6$ fixed to shaft $g^7$, $g^8$ is a worm fixed to shaft $g^7$ which drives worm gear $g^9$ fixed to shaft F; all as in the previously described form of my invention.

The casing for the valves is different from the casing in the previously described type of my apparatus and has 14 chambers; of which chambers $K^1$, $K^2$, $K^4$, $K^5$, and $K^6$ are at the back of the casing; chambers $K^9$, $K^{10}$, $K^{11}$, $K^{12}$, $K^{13}$, and $K^{14}$ are at the front of the casing; chambers $K^3$ and $K^7$ are at the right side and chamber $K^8$ is at the left side of the casing when seen from the front as in Fig. 29.

Chamber $K^1$ has a port $k^1$ connecting it with chamber $K^9$ and this port is controlled by the uppermost valve 1ª. The brine pipe $b^4$ connects chamber $K^1$ with the brine tank B. Chamber $K^9$ is in open communication with chamber $K^3$.

Chamber $K^2$ has a port $k^2$ connecting it with chamber $K^{10}$, which port is controlled by the valve next to the top one designated as 2ª. Chamber $K^{10}$ is connected with the soft water pipe S.

Chamber $K^2$ also has a port $k^3$ connecting it with chamber $K^{11}$ and this port is controlled by the next lower valve $3^a$. Chamber $K^{11}$ is in open communication with chamber $K^8$. Chamber $K^2$ lies directly back of chamber $K^{10}$ and the major portion of $K^{11}$. Chambers $K^2$ and $K^3$ are in open communication, together forming in fact a single chamber L-shaped in cross section as shown in Figs. 36 and 37. Chamber $K^3$ has no port and is connected by pipe $a$ with the tank A. Chamber $K^3$ is in open communication with the chamber $K^{12}$, which latter chamber is directly in front of the chamber $K^{14}$.

Chamber $K^4$ has a port $k^4$ connecting it with chamber $K^{12}$, which port is controlled by valve $4^a$. Chamber $K^4$ is in open communication with chamber $K^7$. Hard water pipe H is connected with chamber $K^7$.

Chamber $K^5$ has a port $k^5$ controlled by valve $5^a$, connecting it with chamber $K^{13}$, which lies directly in front of a portion of chamber $K^5$. Chamber $K^{13}$ is in open communication with chamber $K^8$ and waste pipe W is connected with chamber $K^8$ to carry brine and wash water to the sewer.

Chamber $K^6$ is in open communication with chamber $K^7$ and has a port $k^6$ controlled by valve $6^a$ connecting it with chamber $K^{14}$, which lies directly in front of $K^6$. Pipe $a^3$ connects pipe $a^2$ with chamber $K^5$.

The valves $1^a$, $2^a$, $3^a$, $4^a$, $5^a$, and $6^a$ have stems $v^1$, $v^2$, $v^3$, $v^4$, $v^5$, and $v^6$, respectively, terminating outwardly in forked cam roll holders $v^7$, $v^8$, $v^9$, $v^{10}$, $v^{11}$, and $v^{12}$, respectively each having a cam roll $v^{13}$ rotatably mounted on a stud $v^{14}$ therein. Each of these valves is normally held in closed position by a spring $x$.

To the cam shaft F are fixed cams $f^1$, $f^2$, $f^3$, $f^4$, $f^5$ and $f^6$ with peripheral tracks pressed against the cam rolls $v^{13}$ of the cam roll holders $v^7$, $v^8$ $v^9$, $v^{10}$, $v^{11}$, and $v^{12}$, respectively, and these cams are adapted to push open their respective valves $1^a$, $2^a$, $3^a$, $4^a$, $5^a$, and $6^a$.

During the water softening operation no electric current is flowing to the motor. When by continued softening of water the water softening capacity of the zeolite has been substantially exhausted the switch $T^1$ is thrown closing the circuit and starting the motor E.

As soon as the switch $T^1$ is closed the motor E starts running and rotates the shaft F in the direction shown by the arrows in Fig. 27, very slowly through worms and gears $g^2$, $g^3$, $g^5$, $g^6$, $g^8$, and $g^9$.

During the water softening operation, the cam roll $v^{13}$ of valve $2^a$ is on the point $f^{22}$ of the cam $f^2$ opening that valve to allow softened water to flow from the tank A through pipe $a$, chamber $K^3$, chamber $K^2$, port $k^2$, chamber $K^{10}$, and pipe S to service. At the same time the cam roll $v^{13}$ of valve $6^a$ is on the point $f^{26}$ of cam $f^6$ opening that valve to allow hard water that is to be softened to flow from the pipe H to chamber $K^7$, chamber $K^6$, port $k^6$, chamber $K^{14}$ and pipe $a^2$ to the tank A. This valve setting establishes the conditions shown in Fig. 47, which ensure the passage of hard water to be softened, upwardly through the zeolite bed Z; and the passage of the same water after it has been softened by the base exchange action of the zeolites, out of the softening tank and to service.

Rotation of the cam shaft F, which is always in the direction indicated by the arrows, Fig. 27 and of the arrows on the separate cams Figs. 41 to 46 inclusive, causes the cam rolls of valves $2^a$ and $6^a$ to pass off the points $f^{22}$ and $f^{26}$ respectively, whereupon valves $2^a$ and $6^a$ are closed by the action of their springs $x$.

The cams $f^1$ and $f^5$ are so set on the cam shaft F in relation to cams $f^2$ and $f^6$ that immediately after the valves $2^a$ and $6^a$ have closed, the cam roll of valve $1^a$ passes onto the point $f^{21}$ of cam $f^1$ opening valve $1^a$ to allow brine to flow from the tank B through pipe $b^4$, chamber $K^1$, port $k^1$, chamber $K^9$, chamber $K^3$ and pipe $a$ to tank A. At the same time the cam roll of valve $5^a$ passes onto the point $f^{25}$ of cam $f^5$ opening valve $5^a$ to allow spent brine to flow from the tank A through pipes $a^2$ and $a^3$, chamber $K^5$, port $k^5$ chamber $K^{13}$, chamber $K^8$ and pipe W to the sewer. This valve setting establishes the conditions shown in Fig. 48, which ensure the passage of brine downwardly through the zeolite bed Z in the tank A to regenerate the zeolites.

Further rotation of the cam shaft F causes the cam roll of valve $1^a$ to pass off the point $f^{21}$ and allow the valve to be closed by the action of its spring.

Immediately after the valve $1^a$ has closed, valve $5^a$ still remaining open, the cam roll of valve $4^a$ passes on to the point $f^{24}$ of cam $f^4$ opening valve $4^a$ and allowing hard water to flow from pipe H through chamber $K^7$, chamber $K^4$, port $k^4$, chamber $K^{12}$, chamber $K^3$ and pipe $a$ into tank A washing all residue of brine out of the casing K and passing downwardly through the bed of zeolites Z in the tank A, rinses them free of brine and this brine laden wash water passes out of tank A, through pipes $a^2$ and $a^3$, chamber $K^5$, port $k^5$, chamber $K^{13}$, chamber $K^8$, and pipe W, to the sewer. This valve setting establishes the conditions shown in Fig. 49, which ensure the passage of wash water downwardly through the zeolite bed and thence to waste.

Further rotation of the cam shaft F causes the cam rolls of valves $4^a$ and $5^a$ to pass off the points $f^{24}$ and $f^{25}$ respectively, and allow valves $4^a$ and $5^a$ to be closed by their springs.

Immediately after valves $4^a$ and $5^a$ have closed the cam roll of valve $3^a$ passes on to the point $f^{23}$ of cam $f^3$ opening valve $3^a$ and allowing hard water above the zeolite bed in tank A to flow thence through pipe $a$, chamber $K^3$, chamber $K^2$, port $k^3$, chamber $K^{11}$, chamber $K^8$ and pipe W to the sewer. At the same time the cam roll of valve $6^a$ passes onto the point $f^{26}$ of the cam $f^6$ opening valve $6^a$ and allowing hard water to flow from pipe H, through chamber $K^7$, chamber $K^6$, port $k^6$, chamber $K^{14}$, and pipe $a^2$, into the tank A and pass upwardly through said tank. This valve setting establishes the conditions shown in Fig. 50, which ensure the passage of water upwardly through the zeolite bed to force out of tank A and to waste the body of hard water remaining above the zeolite bed after the bed has been rinsed free of brine by passing the hard wash water downwardly through it.

The zeolites have at this time been revivified and the apparatus may now be set to soften water. Further rotation of the cam shaft F causes the cam roll of valve $3^a$ to pass off the point $f^{23}$ of cam $f^3$ allowing the valve $3^a$ to be closed by the action of its spring.

While this is taking place valve $6^a$ remains open and the cam roll of valve $2^a$ passes on to point $f^{22}$ of cam $f^2$ opening valve $2^a$, reestablishing the valve setting for the water softening operation.

Gear $g^9$ has fixed to its upper side a lug $g^{10}$ and each complete revolution of this gear causes this lug to contact with one of the points of a star wheel $p$ of a switch P connected in series with switch $T^1$, opening the circuit and shutting off the power from the motor. During the time that the motor is not operating the water softening operation will continue until the base exchange capacity of the zeolites has been exhausted.

It is obvious that a water softener fully automatically controlled may be provided with this type of apparatus the same as with the one previously described, as by placing in the hard or soft water line a water meter adapted to close switch $T^1$ after passage of a predetermined amount of water, and that provision may be made for downward softening as with the device to be herein next described.

Referring now to the drawings, Figures 51 to 65:—In this modified form of the apparatus A is the water softener container, Z the bed of zeolites, $z$ the bed of gravel, $z^1$ the screen on which the gravel rests, $z^3$ the space under said screen, $z^2$ the space above the zeolite bed, $a$ the pipe from the top of the tank A to the casing for the valves designated in this type as J, $a^2$ the pipe connecting casing J with the bottom of tank A; $A^1$ is a hand hole cover through which the gravel and zeolites are filled into the tank A, B is a brine tank, $b$ the screen near the bottom of the brine tank, $b^1$ the space under the screen, $b^2$ the pipe connecting tank B with hard water supply line H, $b^3$ a check valve in pipe line $b^2$, $b^4$ a pipe connecting the casing J and tank B and extending down into said tank below screen $b$; $B^1$ is a hand hole cover through which additional brine may be added; S is a soft water supply line leading out from casing J, and W is a waste pipe connecting casing J with the sewer. All as in the first described form of my invention.

Casing J has a bracket $j^{14}$ at one end and $j^{15}$ at the other end carrying journals $j^{23}$ and $j^{24}$, respectively, for the horizontal cam shaft designated in this type as I, and also journals $j^{25}$ and $j^{26}$ respectively, for the horizontal rock shaft Q. Bracket $j^{15}$ is extended laterally at $j^{20}$ to form a housing for the gears and this housing portion has cover $j^{21}$. Brackets $j^{14}$ and $j^{15}$ have at their upper end a spacer $j^{27}$ which tends to hold the two brackets rigidly in position.

E is the electric motor, $e$ its shaft, $e^3$ a pulley thereon connected by belt $e^4$ with a pulley $g^{11}$ which is secured to a shaft $g^{12}$ journalled in bracket $j^{15}$ and cover $j^{21}$. A worm $g^{13}$ is also fixed to shaft $g^{12}$; $g^{14}$ is a worm gear driven by worm $g^{13}$ and is fixed to shaft $g^{15}$ journalled in bracket $j^{15}$ and cover $j^{21}$. Shaft $g^{15}$ has a worm $g^{16}$ rotatively secured to it and adapted to drive worm gear $g^{17}$ fixed to cam shaft I.

The casing for the valves is different from the casing in the previously described types of my apparatus and has twelve chambers, of which chambers $J^{16}$, $J^{17}$, $J^{18}$, $J^{19}$ and $J^{20}$ are at the bottom of the casing J; $J^{21}$, $J^{22}$, $J^{23}$, $J^{24}$ and $J^{25}$ are at the top of the casing, and chambers $J^{26}$ and $J^{27}$ extend from top to bottom of the casing.

Chamber $J^{16}$ has a port $j^{16}$ connecting it with chamber $J^{21}$ and this port is controlled by valve $5^j$.

Pipe H admits hard water from the supply line to chamber $J^{16}$, thence it flows through port $j^{16}$ to chamber $J^{21}$, then to chamber $J^{26}$, which is in open communication with chamber $J^{21}$, and thence through pipe $a$ to the top of the softener A above the zeolite bed Z. This hard water in passing downwardly through the zeolite bed is softened and flows out of tank A through pipe $a^2$ into chamber $J^{27}$, which is in open communication with chamber $J^{17}$, thence the soft water flows upwardly through port $j^{17}$, which port is controlled by valve $1^j$, into chamber $J^{23}$ and thence through pipe S to service.

When the water softening capacity of the zeolites has been substantially exhausted or when a packed bed of zeolites with the dirt accumulation thereon resists the downflow of water to such an extent that an undesirable pressure is built up in the water softener tank A, the bed must be backwashed. The backwash flow is effected by closing all valves except $3^j$ and $4^j$, which are opened allowing hard water to flow from the pipe H into chamber $J^{16}$, thence through port $j^{22}$, controlled by valve $3^j$, into chamber $J^{22}$, which is in open communication with chamber $J^{27}$, thence through pipe $a^2$ to the bottom of the softener A, upwardly through the softener bed and out of the tank thereof carrying the accumulated dirt with it through pipe $a$ into chamber $J^{26}$, which is in open communication with $J^{19}$, thence through port $j^{19}$, which is controlled by the valve $4^j$ into chamber $J^{24}$ and thence through pipe W to the sewer.

As soon as backwashing is completed all valves are closed excepting $2^j$ and $6^j$ which are opened permitting brine to flow from tank B through pipe $b^4$ into chamber $J^{20}$ through port $j^{20}$, controlled by valve $6^j$ into chamber $J^{25}$ and thence through pipe $a^3$ into the tank A in the space $z^2$ above the zeolite bed; thence the brine passes downwardly through the zeolite bed regenerating the zeolites and passes out of the casing at the bottom thereof through pipe $a^2$ and thence into chamber $J^{27}$ which is in open communication with chamber $J^{18}$, thence through port $j^{18}$, controlled by valve $2^j$, into chamber $J^{24}$ and thence through the waste pipe W to the sewer.

To rinse the zeolite bed Z free of spent brine the valve $2^j$ is left open, the valve $6^j$ is closed and the valve $5^j$ is opened allowing hard water for rinsing purposes to flow from the pipe H into chamber $J^{16}$, thence through port $j^{16}$, controlled by valve $5^j$, into chamber $J^{21}$, thence into chamber $J^{26}$ which is in open communication with chamber $J^{21}$, and thence into and through pipe $a$ to the top of the softener A, thence down through the zeolite bed and following the course of the spent brine out from the bottom of tank A, through pipe $a^2$, chamber $J^{27}$, chamber $J^{18}$, port $j^{18}$, chamber $j^{24}$ and wipe W to the sewer. Valve $2^j$ is now closed and $5^j$ left open establishing again the flow through the apparatus of hard water being softened.

The valves $1^j$, $2^j$, $3^j$, $4^j$, $5^j$ and $6^j$ have stems $v^1$, $v^2$, $v^3$, $v^4$, $v^5$ and $v^6$, respectively, each of whose outer ends is adapted to be pressed upon to open its valve by adjustable set screws $q$ secured to the end of each of the rocker arms $q^1$, $q^2$, $q^3$, $q^4$, $q^5$, and $q^6$ and pivoted on rock shaft Q. To each of the said rocker arms is pivoted on a stud $q^{14}$ a cam roll $q^{13}$.

To the cam shaft I are fixed cams $i^1$, $i^2$, $i^3$, $i^4$, $i^5$ and $i^6$ with peripheral tracks each adapted to press against one of the cam rolls $q^{13}$ of the rocker arms $q^1$, $q^2$, $q^3$, $q^4$, $q^5$ and $q^6$, respectively, and these cams are adapted to push open their respective valves $1^j$, $2^j$, $3^j$, $4^j$, $5^j$ and $6^j$, respectively, by causing the adjustable set screws $q$ to bear down upon the valve stems $v^1$, $v^2$, $v^3$, $v^4$, $v^5$ and $v^6$, respectively, overcoming the seating tendency of their respective springs $x$, each of which is adapted to normally hold its valve in closed position.

During the water softening operation no electric current is flowing to the motor. When by continued softening of water the water softening capacity of the zeolite has been substantially exhausted the switch $T^1$ is thrown closing the circuit and starting the motor E. As soon as the switch $T^1$ is closed the motor E starts running and rotates the shaft I in the direction shown by the arrows in Fig. 59, Fig. 60 and Fig. 61, very slowly through grooved pulley $e^3$, belt $e^4$, pulley $g^{11}$, worms and worm gears $g^{13}$, $g^{14}$, $g^{16}$ and $g^{17}$.

During the water softening operation, the cam roll $q^{13}$ of the rocker arm $q^1$ is on the point $i^{21}$ of the cam $i^1$, opening valve $1^j$ to allow softened water to flow from the tank A through pipe $a^2$, chamber $J^{27}$, chamber $J^{17}$, port $j^{17}$ chamber $J^{23}$ and pipe S to service. At the same time the cam roll $q^{13}$ of rocker arm $q^5$ is on the point $i^{25}$ of the cam $i^5$, opening valve $5^j$ to allow hard water that is to be softened to flow from the pipe H to chamber $J^{16}$, port $j^{16}$, chamber $J^{21}$, chamber $J^{26}$ and pipe $a$ to the tank A. This valve setting establishes the conditions shown in Fig. 62, which ensure the passage of hard water to be softened, downwardly through the zeolite bed Z and the passage of the same water after it has been softened by the base exchange action of the zeolites, out of the softening tank and to service.

Rotation of the cam shaft I, which is always in the direction indicated by the arrows in Fig. 59, Fig. 60 and Fig. 61 causes the cam rolls of valves $1^j$ and $5^j$ to pass off the points $i^{21}$ and $i^{25}$, respectively, whereupon valves $1^j$ and $5^j$ are closed by the action of their springs $x$.

The cams $i^3$ and $i^4$ are so set on the cam shaft I in relation to the cams $i^1$ and $i^5$ that immediately after the valves $1^j$ and $5^j$ have closed, the cam roll of rocker arm $q^4$ passes onto the point $i^{24}$ of cam $i^4$, opening valve $4^j$ to allow the back wash water to flow from the tank A through pipe $a$, chamber $J^{26}$, chamber $J^{19}$, port $j^{19}$, chamber $J^{24}$ and pipe W to the sewer. At the same time the cam roll of rocker arm $q^3$ passes onto the point $i^{23}$ of cam $i^3$, opening valve $3^j$ to allow hard water for backwashing to flow from the pipe H through chamber $J^{16}$, port $j^{22}$, chamber $J^{22}$, chamber $J^{27}$ and pipe $a^2$ to the tank A. This valve setting establishes the conditions shown in Fig. 63, which ensure the passage of hard water for backwashing upwardly through the zeolite bed Z in the tank A to break up and wash out the dirt accumulation.

Further rotation of the cam shaft I causes the cam roll of rocker arms $q^4$ and $q^3$ to pass off the points $i^{24}$ and $i^{23}$ respectively, and allow these valves to be closed by the action of their springs. Immediately after the valves $3^j$ and $4^j$ have closed the cam roll of rocker arm $q^6$ passes onto the point $i^{26}$ of cam $i^6$, opening valve $6^j$ to allow brine to flow from the tank B through pipe $b^4$, chamber $J^{20}$, port $j^{20}$, chamber $J^{25}$ and pipe $a^3$ to tank A. At the same time cam roll of rocker arm $q^2$ passes onto the point $i^{22}$ of cam $i^2$, opening valve $2^j$ to allow spent brine to flow from the tank A through pipe $a^2$, chamber $J^{27}$, chamber $J^{18}$, port $j^{18}$, chamber $J^{24}$ and pipe W to the sewer. This valve setting establishes the conditions shown in Fig. 64, which ensure the passage of brine downwardly through the zeolite bed Z in the tank A to regenerate the zeolites.

Further rotation of the cam shaft I causes the cam roll of rocker arm $q^6$ to pass off the point $i^{26}$ and allow the valve $6^j$ to be closed by the action of its spring.

Immediately after the valve $6^j$ has closed, valve $2^j$ still remaining open, the cam roll of rocker arm $q^5$ passes onto point $i^{25}$ of cam $i^5$, opening valve $5^j$ and allowing hard water to flow from pipe H through chamber $J^{16}$, port $j^{16}$, chamber $J^{21}$, chamber $J^{26}$ and pipe $a$ into tank A, washing all residue of brine out of the casing J and passing downwardly through the bed of zeolites Z in the tank A, rinses them free of brine and this brine-laden wash water passes out of tank A through pipe $a^2$, chamber $J^{27}$, chamber $J^{18}$, port $j^{18}$, chamber $J^{24}$ and pipe W to the sewer. This valve setting establishes the conditions shown in Fig. 65, which ensure the passage of wash water downwardly through the zeolite bed and thence to waste.

The zeolites have at this time been revivified and the apparatus may now be set to soften water. Further rotation of the cam shaft I causes the cam roll of rocker arm $q^2$ to pass off the point $i^{22}$ of cam $i^2$ allowing the valve $2^j$ to be closed by the action of its spring.

While this is taking place valve $5^j$ remains open and the cam roll of rocker arm $q^1$ passes onto the point $i^{21}$ of cam $i^1$, opening valve $1^j$ completing the re-establishment of the valve setting for the water softening operation.

Cam shaft I has fixed to its outer end a sprocket $i^{27}$ and each complete revolution of this sprocket $i^{28}$ through chain $i^{28}$ and sprocket $y$ causes switch Y to be thrown open. Switch Y is connected in series with switch $T^1$, opening the circuit and shutting off the power from the motor. During the time that the motor is not operating the water softening operation will continue until the base exchange capacity of the zeolites has been exhausted.

It is obvious that a water softener fully automatically controlled may be provided with this type of apparatus the same as with the first described device, as by placing in the hard or soft water line a water meter adapted to close switch $T^1$ after passage of a predetermined amount of water, and that a suitable casing may be provided for upward softening as in the two types previously described.

Referring now to the drawings, Fig. 66 to Fig. 85:—In this modified form of the apparatus A is the container, Z the bed of zeolites, $z$ the bed of gravel, $z_1$ the screen on which the gravel rests, $z^3$ the space under said screen, $z^2$ the space above the zeolite bed, $a$ the pipe from the top of the tank A to the casing for the valves designated in this type as U, $a^2$ another pipe connecting casing U with tank A and extending downwardly thereinto; R is a base for the tanks, $A^1$ is a fill cap for the tank A, B is a brine tank, $b$ the screen near the bottom of the brine tank, $b^1$ the space under the screen, $b^2$ a pipe connecting tank B with the hard water supply line H, $b^3$ a check valve in pipe line $b^2$, $b^4$ another pipe connecting the casing U and tank B and extending down into said tank below screen $b$; $B^1$ is a fill cap for tank B, S is a soft water supply line leading out from casing U; W is a waste pipe connecting casing U with the sewer; E is the electric motor mounted on the bracket $u^{14}$, and its shaft $e$ is resiliently connected by spring $e^1$ to drive shaft $g$ journalled in the housing G mounted on casing U; a worm $g^2$, fixed to shaft $g$, meshes with and drives worm gear $g^3$, which in turn is fixed to shaft $g^4$ journalled in the housing G; to the shaft $g^4$ is fixed a worm $g^5$ which meshes with and drives worm gear $g^6$, which in turn is fixed to shaft $g^7$ also journalled in housing G; fixed to the shaft $g^7$ is a worm $g^8$ which meshes with and drives worm gear $g^9$, all as in the previously described form of my invention.

The casing for the valves is different from the casing in the previously described types of my apparatus and has seven chambers, of which chambers $U^1$, $U^2$, $U^3$ and $U^4$ are at the bottom of the casing and chambers $U^5$, $U^6$ and $U^7$ are at the top of the casing.

Chamber $U^1$ has a port $u^1$ connecting it with chamber $U^5$ and this port is controlled by valve $I^u$. The brine pipe $b^4$ connects chamber $U^1$ with the brine tank B.

Chamber $U^2$ has a port $u^2$ connecting it with the chamber $U^5$, which port is controlled by valve $2^u$. Chamber $U^2$ is connected with the soft water pipe S.

Chamber $U^3$ has a port $u^3$ connecting it with chamber $U^7$, which port is controlled by valve $3^u$. Chamber $U^7$ is connected by pipe $a^2$ with the tank A.

Chamber $U^3$ also has a port $u^5$ connecting it with chamber $U^5$, which port is controlled by valve $5^u$. Waste pipe W is connected with chamber $U^3$.

Chamber $U^4$ has a port $u^4$ connecting it with chamber $U^5$, which port is controlled by valve $4^u$. Hard water pipe H is connected with chamber $U^4$.

Chamber $U^4$ also has a port $u^6$ connecting it with chamber $U^6$, which port is controlled by valve $6^u$. Pipe $a^3$ connects pipe $a^2$ with chamber $U^6$.

The valves $I^u$, $2^u$, $3^u$, $4^u$, $5^u$ and $6^u$ have stems $v^1$, $v^2$, $v^3$, $v^4$, $v^5$ and $v^6$ respectively, terminating outwardly with forked cam roll holders, each having a cam roll $v^{13}$ rotatably mounted on a stud $v^{15}$ therein. Each of these valves is normally held in closed position by a spring $x$.

The cam disk O is free to rotate on cam stud L, which is fixed to gear housing G. To disk O are fixed concentrically arranged cams $o^6$, $o^1$, $o^3$, $o^4$, $o^2$, and $o^5$, and these cams are adapted to push open their respective valves $6^u$, $I^u$, $3^u$, $4^u$, $2^u$ and $5^u$.

During the water softening operation no electric current is flowing to the motor. When by continued softening of water the water softening capacity of the zeolite has been substantially exhausted the switch $T^1$ is thrown closing the circuit and starting the motor E.

As soon as the switch $T^1$ is closed the motor E starts running and rotates the cam disk O in the direction shown by the arrows in Fig. 67 and Fig. 68, very slowly through worms and gears $g^2$, $g^3$, $g^5$, $g^6$, $g^8$ and $g^9$.

During the water softening operation, the cam roll $v^{13}$ of valve $2^u$ is on the point $o^{22}$ of the cam $o^2$ opening that valve to allow softened water to flow from the tank A through pipe $a$, chamber $U^5$, port $u^2$, chamber $U^2$, and pipe S to service. At the same time the cam roll $v^{13}$ of valve $6^u$ is on the point $o^{26}$ of cam $o^6$ opening that valve to allow hard water that is to be softened to flow from the pipe H through chamber $U^4$, port $u^6$, chamber $U^6$ and pipes $a^3$ and $a^2$ to tank A. This valve setting establishes the conditions shown in Fig. 82, which ensure the passage of hard water to be softened, upwardly through the zeolite bed Z; and the passage of the same water after it has been softened by the base exchange action of the zeolites, out of the softening tank and to service.

Rotation of the cam disk O, which is always in the direction indicated by the arrows Fig. 67 and Fig. 68 causes the cam roll of valves $2^u$ and $6^u$ to pass off the points $o^{22}$ and $o^{26}$ respectively, whereupon valves $2^u$ and $6^u$ are closed by the action of their springs $x$.

The cams $o^1$ and $o^3$ are so placed on the disk O in relation to cams $o^2$ and $o^6$ that immediately after the valves $2^u$ and $6^u$ have closed, the cam roll of valve $I^u$ passes onto the point $o^{21}$ of cam $o^1$ opening valve $I^u$ to allow brine to flow from the tank B through pipe $b^4$, chamber $U^1$, port $u^1$, chamber $U^5$ and pipe $a$ to tank A. At the same time the cam roll of valve $3^u$ passes onto the point $o^{23}$ of cam $o^3$ opening valve $3^u$ to allow spent brine to flow from the tank A through pipe $a^2$, chamber $U^7$, port $u^3$, chamber $U^3$ and pipe W to the sewer. This valve setting establishes the conditions shown in Fig. 83, which ensure the passage of brine downwardly through the zeolite bed Z in the tank A to regenerate the zeolites.

Further rotation of the cam disk O causes the cam roll of valve $I^u$ to pass off the point $o^{21}$ and allow the valve to be closed by the action of its spring.

Immediately after the valve $I^u$ has closed, valve $3^u$ still remaining open, the cam roll of valve $4^u$ passes onto the point $o^{24}$ of cam $o^4$ opening valve $4^u$ and allowing hard water to flow from pipe H through chamber $U^4$, port $u^4$, chamber $U^5$ and pipe $a$ into tank A, washing all residue of brine out of the casing U and passing downwardly through the bed of zeolites Z in tank A, rinses them free of brine and this brine laden wash water passes out of tank A, through pipe $a^2$, chamber $U^7$, port $u^3$, chamber $U^3$ and pipe W to the sewer.

This valve setting establishes the conditions shown in Fig. 84, which ensure the passage of wash water downwardly through the zeolite bed and thence to waste.

Further rotation of the cam disk O causes the cam rolls of valves $4^u$ and $3^u$ to pass off the points $o^{24}$ and $o^{23}$ respectively, and allow valves $4^u$ and $3^u$ to be closed by their springs.

Immediately after valves $4^u$ and $3^u$ have closed the cam roll of valve $5^u$ passes on to the point $o^{25}$ of cam $o^5$ opening valve $5^u$ and allowing hard water above the zeolite bed in tank A to flow thence through pipe $a$, chamber $U^5$, port $u^5$, chamber $U^3$ and pipe W to the sewer. At the same time the cam roll of valve $6^u$ passes onto the point $o^{26}$ of cam $o^6$ opening valve $6^u$ and allowing hard water to flow from pipe H, through chamber $U^4$, port $u^6$, chamber $U^6$ and pipes $a^3$ and $a^2$ into tank A and pass upwardly through said tank.

This valve setting establishes the conditions shown in Fig. 85, which ensure the passage of water upwardly through the zeolite bed to force out of tank A and to waste the body of hard water remaining above the zeolite bed after the bed has been rinsed free of brine by passing the hard wash water downwardly through it.

The zeolites have at this time been revivified and the apparatus may now be set to soften water. Further rotation of the cam disk O causes the cam roll of valve $5^u$ to pass off of point $o^{25}$ of the cam $o^5$ allowing the valve $5^u$ to be closed by the action of its spring.

While this is taking place valve $6^u$ remains open and the cam roll of valve $2^u$ passes on to point $o^{22}$ of cam $o^2$ opening valve $2^u$, reestablishing the valve setting for the water softening operation.

Gear $g^9$ has fixed to its upper side switch $Y^1$ and each complete revolution of this gear causes switch $Y^1$ to be thrown open, and as it is connected in series with switch $T^1$ this opens the circuit and shuts off the power from the motor.

During the time that the motor is not operating the water softening operation will continue until the base exchange capacity of the zeolites has been exhausted.

It is obvious that a water softener fully automatically controlled may be provided with this type of apparatus the same as with the first described, as by placing in the hard or soft water line of water meter adapted to close switch T¹ after passage of a predetermined amount of water, and that provisions may be made for downward softening as with the third type herein described.

Obviously, one skilled in the art of zeolite water softening might make many modifications in any of the types of apparatus herein illustrated and described in addition to those already suggested herein without departing from the spirit of my invention. For instance, by way of illustration and not to exclude other changes, instead of a chambered valve casing the valves may be attached direct to suitable pipe connections; and instead of any of these arrangements of valves or means for operating same any arrangement of valves or means for operating same may be used.

I claim as my invention and desire to secure by Letters Patent of the United States:—

1. A zeolite water softener comprising a softener tank, a zeolite bed in the softener tank, a conduit to the softener tank terminating therein above the zeolite bed, another conduit to the softener tank terminating therein below the zeolite bed, a brine tank, a conduit to admit water to the brine tank, a conduit to withdraw brine from the brine tank, a conduit connecting the brine withdrawal conduit with one of the conduits connected to the softener tank, a valve to open and close said connecting conduit, a conduit connecting the hard water supply with a conduit connected to the softener tank, a valve to open and close said connecting conduit, a conduit connecting one of the conduits connected to the softener tank with the softened water service delivery, a valve to open and close said connecting conduit, a conduit connecting one of the conduits connected to the softener tank with waste disposal, a valve to open and close said connecting conduit, mechanical means for operating all of said valves, an independent constant speed motor having a mechanical operating connection with said valve operating means, said motor and mechanical connection upon a single continuous operation moving the valve operating means to complete a cycle of valve operations effecting regeneration of the zeolite bed, switching means for starting said motor and switching means having a mechanical operating connection with said valve operating means, said operating connection and switching means being adapted to stop the motor after a predetermined time following the starting of the motor.

2. A zeolitic water softener comprising a softener tank, a zeolite bed in the softener tank, a conduit to the softener tank terminating therein above the zeolite bed, another conduit to the softener tank terminating therein below the zeolite bed, a brine tank, a conduit to admit water to the brine tank, a conduit to withdraw brine from the brine tank, a conduit connecting the brine withdrawal conduit with one of the conduits connected to the softener tank, a spring closed valve to open and close said connecting conduit, a conduit connecting the hard water supply with a conduit connected to the softener tank, a spring closed valve to open and close said connecting conduit, a conduit connecting one of the conduits connected to the softening tank with the softened water service delivery, a spring closed valve to open and close said connecting conduit, a conduit connecting one of the conduits connected to the softener tank with waste disposal, a spring closed valve to open and close said connecting conduit, mechanical means for opening said valves, an independent continuously operating constant speed motor having a mechanical operating connection with said valve opening means, a switch arranged to start said motor in response to flow of the water being softened and switching means having a mechanical operating connection with said valve opening means, said operating connection and switching means being adapted to stop the motor after a predetermined time following the starting of the motor.

3. A pressure system zeolite water softener comprising a softener tank, a zeolite bed in the softener tank, a conduit to the softener tank terminating therein above the zeolite bed, another conduit to the softener tank terminating therein below the zeolite bed, a brine tank, a conduit to admit water to the brine tank, a check valve in said conduit, a conduit to withdraw brine from the brine tank, a conduit connecting the brine withdrawal conduit with one of the conduits connected to the softener tank, a valve, normally closed by spring pressure, to open and close said connecting conduit, a conduit connecting the hard water supply with a conduit connected to the softener tank, a valve normally closed by spring pressure to open and close said connecting conduit, a conduit connecting one of the conduits connected to the softener tank with the softened water service delivery, a valve normally closed by spring pressure to open and close said connecting conduit, a conduit connecting one of the conduits connected to the softener tank with waste disposal, a valve normally closed by spring pressure to open and close said connecting conduit, cams for opening said valves, and independent constant speed power means for operating said cams, said cams and power means acting to open all of said valves in succession for respective periods of time controlled by continuous operation of said power means.

4. A zeolite water softener comprising a softener tank, a zeolite bed in the softener tank, a conduit to the softener tank terminating therein above the zeolite bed, another conduit to the softener tank terminating therein below the zeolite bed, a brine tank, a conduit to admit water to the brine tank, a conduit to withdraw brine from the brine tank, a conduit connecting the brine withdrawal conduit with one of the conduits connected to the softener tank, a valve to open and close said connecting conduit, a conduit connecting the hard water supply with a conduit connected to the softener tank, a valve to open and close said connecting conduit, a conduit connecting one of the conduits connected to the softener tank with the softened water service delivery, a valve to open and close said connecting conduit, a conduit connecting one of the conduits connected to the softener tank with waste disposal, a valve to open and close said connecting conduit, cam means adapted to act upon said valves, independent power means mechanically connected to said cam means, means responsive to flow of water through the softener for switching on the power to said power means, and means operatively connected to said cam means for switching off the power from said power means.

5. A regenerative base exchange water softening apparatus comprising a softening tank and a brine tank, connected conduits with valves for controlling a cycle of several regenerative operations with return to softening, cam means adapted to act upon said valves, independent substantially constant speed power means having mechanical operative connection with said cam means and timing the several valve operations by continuous operation of the motor during said regenerative cycle and means for switching on the power to said power means to start said regenerative cycle, said switching means having an operative connection with said cam means adapted to switch off the power from said power means at the end of said cycle.

6. A regenerative base exchange water softening apparatus having a softening tank and a brine tank, normally closed valves for controlling all the operations of said apparatus, cams for opening each of said valves separately, said cams being on a common shaft, independent electric power means having an operative connection with said cam shaft turning said shaft through one complete revolution in a predetermined period of time by uninterrupted operation of the electric power means and automatic means actuated by said shaft for switching off said power means upon completion of a cycle of operations.

7. In a base exchange water softening system having a softening tank and a brine tank, normally closed valves for controlling all the regenerative operations of said system, cam mechanism for acting upon each of said valves separately to open them, independent constant speed power means for actuating said cam mechanism, metering means actuated by the flow of water through the system adapted to automatically switch on power to said power means, and automatic means operatively connected to the cam mechanism for switching off said power.

8. In a base exchange water softening system having a softening tank and a brine tank, normally closed valves for controlling a cycle of regenerative operations, cam mechanism for acting upon each of said valves separately, independent constant speed electric power means for actuating said cam mechanism, meter controlled means for turning on the power that actuates the cam mechanism when a predetermined quantity of water has flowed therethrough, and means actuated by said cam actuating means for turning off said power at the end of said cycle of operations.

9. In a regenerative base exchange water softening apparatus having a water softening tank and a source of brine supply with conduits and valves controlling all the operations of said apparatus, mechanism adapted to operate said valves in a cycle of predetermined sequence, a constant speed electric motor acting to operate said mechanism to complete said cycle of valve operations in a single continuous operation of the motor, switching means having an operative connection with said valve operating mechanism arranged to cut off the power supply to the motor upon completion of the cycle of valve operations and means for switching on the power supply to the motor to start said cycle.

10. In a regenerative base exchange water softening apparatus having a softening tank and a brine tank with conduits and valves for controlling a cycle of regenerative operations with return to softening, mechanism for acting upon said valves severally in predetermined sequence at predetermined time intervals and independent substantially constant speed power means operating said mechanism continuously through speed reducing means from the beginning to the end of said cycle, said mechanism, power means and speed reducing means cooperating to automatically determine said time intervals.

11. In a regenerative base exchange water softening apparatus having a softening tank and a brine tank with conduits and valve means for controlling a cycle of regenerative operations with return to softening, mechanism for acting upon said valve means at predetermined time intervals, a constant speed electric motor operating said mechanism continuously through speed reducing means from the beginning to the end of said cycle, said mechanism, speed reducing means and motor cooperating to automatically determine said time intervals, and switching means for said motor having an operative connection with the motor adapted to switch off the motor at the end of said cycle.

12. A base exchange water softening system having a tank for containing the base exchange material, a single valve casing containing valves for controlling all the operations of said container tank, said casing having a plurality of chambers with inlets and outlets for hard water, brine, soft water and waste liquids, the valves being located between pairs of chambers, means for operating said valves in proper sequence for regenerating, rinsing and softening, and connections from said casing to the upper and to the lower portions of said tank.

13. A base exchange water softening system comprising a zeolite container, a multiple chambered valve casing, two pipes connecting said container near top and bottom respectively to two of the chambers in the valve casing, the hard water supply, brine supply, soft water service and drain being connected respectively to four other chambers in said casing, still other chambers in said casing forming conduits between chambers, ports between certain pairs of chambers, valves in said ports controlling softening, backwashing, regenerating, and rinsing operations, rotating means for operating said valves in predetermined sequence and an electric motor turning said rotating means, said valves, rotating means and motor being adapted to put the system through one complete cycle of operations by turning the rotating means through one complete revolution.

14. A pressure system regenerative base-exchange water softening apparatus comprising a softening tank and a brine tank, a single multi-chambered valve casing with pipe connections to said tanks and inter-chamber valves controlling a cycle of regenerative operations and return to softening, mechanism for acting upon each of said valves separately at predetermined time intervals in a predetermined sequence and an electric motor for operating said mechanism in a continuous cycle, said time intervals being controlled by the continuous operation of the motor through the regenerative cycle.

15. In a base exchange water softening system having a water softening tank and a source of brine supply, valves for controlling all the operations of said system, mechanism for operating said valves separately at predetermined times, independent constant speed power means for operating said mechanism in a continuous cycle, means operable by said mechanism for cutting off the independent power supply and metering means controlled by the flow of softened water for putting on the independent power supply.

16. In a regenerative base exchange water softening system having a water softening tank, a source of brine supply and connections adapted to effect periodic base exchange regeneration, valve mechanism for effecting the periodic regenerative operations in a cycle of predetermined sequence, an electric motor for operating said valve mechanism in a continuous cycle to effect regeneration, an electric power circuit supplying current to said motor, a switch in said motor circuit adapted to be automatically shifted by said motor at the end of said cycle of operations to open said motor circuit, a second switch in said motor circuit connected in electrical series with said first named switch and automatic means for operating said second switch to close said motor circuit in response to a flow of a predetermined quantity of the water being softened after said circuit opening.

17. In a regenerative base exchange water softening system having a water softening tank, a source of brine supply and connections adapted to effect periodic base exchange regeneration, valve mechanism for effecting the periodic regenerative operations in a cycle of predetermined sequence, an electric motor mechanically operating and timing said valve mechanism by continuous operation through said cycle, an electric power circuit supplying current to said motor, a switch in said electric circuit with a mechanical connection to said motor adapted to open the switch at the end of said cycle of regenerative operations, a water meter actuated by the flow of water being softened and a mechanical connection between the switch and the meter adapted to close the switch upon flow of a predetermined quantity of water through the meter.

18. In a regenerative base exchange water softener having a softening tank with supply, service and drain connections, a source of brine and the several connections required for a cycle of regenerative operations, means for automatic operation and control of the regenerative cycle comprising valve means for controlling said connections, an independent constant speed motor, positive mechanical means connecting the motor with the valve means, said motor running continuously upon being started to operate said valve means so as to make the several connections for the regenerative cycle in a predetermined sequence of the several connections maintained for predetermined respective periods of time and for return to softening at the end of said cycle, means for starting the motor and means operated by the motor automatically stopping the motor upon said return of the valve means to said softening connection.

19. In a water softening apparatus, a container for water softening material, a flow system adapted to establish flow connections between said container and a source of water supply, a source of regenerating material, a drain, and a point of use, mechanism in said flow system controlling the flow through said system, for interrupting the flow from the container to the point of use, establish flow to the drain, and to cause flow from the source of regenerating material through the container to the drain, a motor for said mechanism, an electrical control circuit for said motor, means operative by the flow in said system for energizing said control circuit and means operative by said mechanism for deenergizing said circuit.

20. In a water softening apparatus, a container for water softening material, a flow system adapted to establish flow connections between said container and a source of water supply, a source of regenerating material, a drain and a point of use, mechanism in said flow system controlling the flow through said system, for interrupting the flow from the container to the point of use, establish flow to the drain, and to cause flow from the source of regenerating material through the container to the drain, a motor for said mechanism, electrical means controlling said motor comprising a plurality of switches one of which is operably connected to said motor, and electrical circuits controlled by said switches, one of said switches controlling the motor circuit to stop the motor in response to movement of the motor, and the other of said switches controlling the motor circuit in response to flow in said system to resume operation of said motor.

21. In a water softening apparatus comprising a container for water softening material, a soft water service pipe, a regenerating solution pipe, a drain pipe and a hard water supply pipe having connection with both ends of said container, valve means adapted to reverse the direction of the flow of hard water through said container in effecting regeneration of the water softening material, a motor controlled by flow of the water passing through said supply pipe, said motor being adapted to actuate said valve means to effect said reversal of flow and by the continuous operation of the motor to automatically control the duration of said reversal.

22. In a water softening apparatus, comprising a container for water softening materials, a soft water service pipe, a regenerating solution pipe, a drain pipe and a hard water supply pipe having connections with both ends of said container, valve means adapted to reverse the direction of the flow of hard water through said container, in effecting regeneration of the water softening material, a motor and means controlled by said motor to actuate said valve means to effect said reversal of flow for a period determined by the continuous operation of the motor.

WALTER J. HUGHES.